US012730459B2

(12) United States Patent
Cong et al.

(10) Patent No.: US 12,730,459 B2
(45) Date of Patent: Sep. 8, 2026

(54) CLEANING ROBOT, AND METHODS AND APPARATUSES FOR CONTROLLING CLEANING ROBOT TO RETURN TO BASE AND MOVE OUT OF BASE

(71) Applicant: Beijing Roborock Innovation Technology Co., Ltd., Beijing (CN)

(72) Inventors: Yiming Cong, Beijing (CN); Yixing Wang, Beijing (CN); Fujian Xiao, Beijing (CN); Yang Liu, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 25 days.

(21) Appl. No.: 18/849,995

(22) PCT Filed: Mar. 21, 2023

(86) PCT No.: PCT/CN2023/082829
§ 371 (c)(1),
(2) Date: Sep. 23, 2024

(87) PCT Pub. No.: WO2023/179616
PCT Pub. Date: Sep. 28, 2023

(65) Prior Publication Data

US 2025/0216867 A1 Jul. 3, 2025

(30) Foreign Application Priority Data

Mar. 23, 2022 (CN) ......................... 202210288057.0

(51) Int. Cl.
*G05D 1/661* (2024.01)
*A47L 9/00* (2006.01)
(Continued)

(52) U.S. Cl.
CPC ............ *G05D 1/661* (2024.01); *A47L 9/0063* (2013.01); *A47L 9/2805* (2013.01); *A47L 9/2852* (2013.01);
(Continued)

(58) Field of Classification Search
CPC .... G05D 1/661; G05D 2105/10; G05D 1/247; G05D 2107/40; G05D 2109/10;
(Continued)

(56) References Cited

U.S. PATENT DOCUMENTS

2019/0369639 A1 12/2019 Yamamura et al.
2020/0022544 A1 1/2020 Gill
(Continued)

FOREIGN PATENT DOCUMENTS

CN 105917284 A 8/2016
CN 108233466 A 6/2018
(Continued)

OTHER PUBLICATIONS

International Search Report from PCT/CN2023/082829 dated Jun. 16, 2023.
(Continued)

*Primary Examiner* — Michael V Kerrigan
(74) *Attorney, Agent, or Firm* — Calfee, Halter & Griswold LLP

(57) ABSTRACT

A method for controlling a cleaning robot to return to a base includes: determining a type of a first target base and first target task information, where the first target base is a base to be docked with the cleaning robot, and the first target task information is information related to a task that needs to be performed by the cleaning robot for returning to the first target base; and controlling, based on the type of the first target base and the first target task information, the cleaning
(Continued)

robot to move onto the first target base according to a respective movement strategy.

19 Claims, 13 Drawing Sheets

(51) Int. Cl.

| | |
|---|---|
| ***A47L 9/28*** | (2006.01) |
| ***A47L 11/40*** | (2006.01) |
| *G05D 105/10* | (2024.01) |

(52) U.S. Cl.

CPC ......... *A47L 9/2894* (2013.01); *A47L 11/4002* (2013.01); *A47L 11/4011* (2013.01); *A47L 11/4091* (2013.01); *A47L 2201/022* (2013.01); *A47L 2201/028* (2013.01); *A47L 2201/04* (2013.01); *G05D 2105/10* (2024.01)

(58) Field of Classification Search

CPC . G05D 2111/14; A47L 9/0063; A47L 9/2805; A47L 9/2852; A47L 9/2894; A47L 11/4002; A47L 11/4011; A47L 11/4091; A47L 2201/022; A47L 2201/028; A47L 2201/04; A47L 11/302; A47L 2201/02; A47L 11/24; A47L 11/284; A47L 11/4005; A47L 11/4061; A47L 11/4094; A47L 2201/00

See application file for complete search history.

(56) References Cited

U.S. PATENT DOCUMENTS

| | | | |
|---|---|---|---|
| 2021/0393099 A1 | 12/2021 | Zhao et al. | |
| 2022/0047141 A1 | 2/2022 | Xu et al. | |
| 2023/0083593 A1 * | 3/2023 | Lindner ................ | A47L 9/2873 700/245 |

FOREIGN PATENT DOCUMENTS

| | | | |
|---|---|---|---|
| CN | 210727661 | U | 6/2020 |
| CN | 111466838 | A | 7/2020 |
| CN | 111743450 | A | 10/2020 |
| CN | 111973071 | A | 11/2020 |
| CN | 112596527 | A | 4/2021 |
| CN | 113499002 | A | 10/2021 |
| CN | 113534809 | A | 10/2021 |
| CN | 113545718 | A | 10/2021 |
| CN | 114027751 | A | 2/2022 |
| CN | 215838750 | U | 2/2022 |
| CN | 114711666 | A | 7/2022 |
| JP | 2022505532 | A | 1/2022 |
| JP | 2022514791 | A | 2/2022 |
| WO | 2015127954 | A1 | 9/2015 |
| WO | 2016193177 | A1 | 12/2016 |
| WO | 2018158844 | A1 | 9/2018 |
| WO | 2021261716 | A1 | 12/2021 |

OTHER PUBLICATIONS

Allowance from Chinese Application No. 202210288057.0 dated Sep. 11, 2023.

First Office Action of JP application No. 2024-556246 dated Feb. 3, 2026.

Extended European Search Report of application No. 23773863.8 dated Feb. 13, 2026.

First Office Action of AU application No. 2023240041 dated Feb. 27, 2026.

* cited by examiner

CLEANING ROBOT, AND METHODS AND APPARATUSES FOR CONTROLLING CLEANING ROBOT TO RETURN TO BASE AND MOVE OUT OF BASE

This application is a U.S. National Stage of International Application No. PCT/CN2023/082829 filed on Mar. 21, 2023, which claims priority to Chinese Patent Application No. 202210288057.0 filed on Mar. 23, 2022, both of which are incorporated herein by reference in their entireties.

TECHNICAL FIELD

The present disclose relates to the field of control over robots, and more particularly to a cleaning robot and a method and apparatus for the cleaning robot to return to and move out of a base.

BACKGROUND

A cleaning robot may be a robot that performs cleaning operations while automatically moving in a certain area to be cleaned without user operation.

When a cleaning robot begins to work, the cleaning robot carries out cleaning tasks starting out from the base. When the cleaning robot needs self-cleaning or the battery level is lower than a preset value, the cleaning robot needs to return to the base for self-cleaning or charging. At present, however, one type of cleaning robot may be equipped with a variety of bases for different functions, such as a base with charging-only function, a base with dust collecting function and charging function, a base with mop washing function and charging function, or a base with dust collecting function, mop washing function and charging function, to meet the requirements of various usages for users. In addition, in a multi-storey building, each floor may be equipped with bases for respective usage requirements, so that users can carry only one cleaning robot to clean different floors, and charge and/or self-clean the cleaning robot by the bases in the floor. In this way, users do not need to carry the base, improving the user experience.

However, the structures of bases with different functions are different, and the cleaning robot moves out of or onto the bases in a single way, which is highly likely leading to cases that the cleaning robot is stuck by the base and cannot move out, or the cleaning robot cannot move onto the base.

SUMMARY

In the present disclosure, a series of concepts in simplified forms are introduced, which will be further illustrated in detail in the Detailed Description. The descriptions of the present disclosure neither mean to attempt to define the critical features and necessary technical features of the claimed technical solution, nor mean to attempt to determine the scope of the claimed technical solution.

In a first aspect, an embodiment of the present disclosure provides a method for controlling a cleaning robot to return to a base, including:

determining a type of a first target base and first target task information, where the first target base is a base to be docked with the cleaning robot, the first target task information is information related to a task that needs to be performed by the cleaning robot for returning to the first target base; and controlling, based on the type of the first target base and the first target task information, the cleaning robot to move onto the first target base according to a respective movement strategy.

Optionally, determining the type of the first target base includes:

acquiring a mode in which the cleaning robot moves onto the first target base and a starting point for the current movement of the cleaning robot;

acquiring a first base type and a second base type when the cleaning robot moves onto the first target base in an automatic mode and the starting point for the current movement of the cleaning robot is the base, where the first base type is the type of the base acting as the starting point for the current movement of the cleaning robot, the second base is the type of the first target base determined during the movement of the cleaning robot towards the first target base; and determining the type of the first target base based on the first base type and the second base type.

Optionally, determining the type of the first target base based on the first base type and the second base type includes:

determining whether the first base type and the second base type are the same, and determining the first base type to be the type of the first target base if the first base type is the same as the second base type; and determining the second base type to be the type of the first target base if the first base type is different from the second base type.

Optionally, determining the type of the first target base further includes:

when the cleaning robot moves onto the first target base in an automatic mode, and the starting point for the current movement of the cleaning robot is not the base, acquiring the second base type, and determining the second base type to be the type of the first target base.

Optionally, determining the type of the first target base further includes:

determining whether a communication signal sent by the first target base is received when the cleaning robot moves onto the first target base in a manual mode, and determining the base type carried in the communication signal to be the type of the first target base if the communication signal sent by the first target base is received; and determining the base type stored by the cleaning robot to be the type of the first target base if the communication signal sent by the first target base is not received.

Optionally, after determining the type of the first target base, the method further includes:

storing the type of the first target base to update the base type stored by the cleaning robot.

Optionally, acquiring the second base type includes:

receiving light rays emitted by a signal lamp on the first target base; and determining the second base type according to the light rays emitted by the signal lamp.

Optionally, the signal lamp includes far-field lamps located on both sides of the centerline of the base and a central seam lamp located on the centerline of the base, and receiving the light rays emitted by the signal lamp on the base includes:

receiving first light rays when the cleaning robot is at a first preset distance from the first target base, where the first light rays are the light ray emitted by the far-field lamp; and receiving second light rays when the cleaning robot moves near the first target base, where the second light rays are the light ray emitted by the central seam lamp.

Optionally, determining the second base type according to the light rays emitted by the signal lamp includes:

converting the first light rays to obtain a first code;

determining an initial type of the first target base based on the first code;

determining whether the initial type includes a subtype, and converting the second light rays to obtain a second code if the initial type includes a subtype;

determining, based on the second code, the subtype to which the first target base belongs, and determining the subtype to be the second base type; and determining the initial type to be the second base type if the initial type does not include a subtype.

Optionally, in a case that the type of the first target base is a charging base with charging function only or a charging base with dust collecting function, and the first target task information indicates a charging task and/or a dust collecting task, controlling the cleaning robot to move onto the first target base according to the respective movement strategy based on the type of the first target base and the first target task information includes:

controlling the cleaning robot to move forward onto the first target base.

Optionally, controlling the cleaning robot to move forward onto the first target base includes:

controlling the cleaning robot to move towards the first target base in an advancing way based on the first light rays;

adjusting the posture of the cleaning robot when the cleaning robot is at a second preset distance from the first target base, so that the centerline of the cleaning robot is roughly aligned with the centerline of the first target base; and controlling the cleaning robot to continue moving towards the first target base in the advancing way, and continuing to adjust the posture of the cleaning robot based on the second light rays during the movement of the cleaning robot, so that the centerline of the cleaning robot is precisely aligned with the centerline of the first target base, until the cleaning robot moves onto the first target base.

Optionally, after controlling the cleaning robot to move forward onto the first target base, the method further includes:

when a docking signal is received, determining whether a continuous task triggering signal is received within a preset time period, and determining that the cleaning robot is successfully docked with the first target base if the continuous task triggering signal is received within the preset time period; and if no continuous task triggering signal is received in the preset time period, controlling the cleaning robot to move onto the first target base again in the advancing way after moving out of the first target base in a retreating way, and repeating the step of determining whether the continuous charging triggering signal is received within the preset time period, until the continuous task triggering signal is received within the preset time period.

Optionally, controlling, based on the type of the first target base and the first target task information, the cleaning robot to move onto the first target base according to the respective movement strategy further includes:

ignoring a triggering signal generated by a cliff sensor at the middle and rear part of the bottom surface of the cleaning robot in the process of controlling the cleaning robot to move forward onto the first target base during the docking stage between the cleaning robot and the first target base, and ignoring a triggering signal generated by a cliff sensor at the front part of the bottom surface of the cleaning robot when the cleaning robot moves within a first preset movement distance.

Optionally, controlling, based on the type of the first target base and the first target task information, the cleaning robot to move onto the first target base according to the respective movement strategy further includes:

storing, when the cleaning robot suspends the action of moving forward onto the first target base, or when the cleaning robot enters a sleeping state and a drive wheel drop sensor of the cleaning robot is not triggered, a state in suspension of the cleaning robot; and when an instruction to continue moving is received, the second light rays are received, and the drive wheel drop sensor of the cleaning robot is not triggered, continuing to ignore the triggering signal generated by the shielded cliff sensor, and controlling the cleaning robot to continue to move onto the first target base with the state in suspension.

Optionally, in a case that the type of the first target base is a charging base with mop cleaning function, and the first target task information indicates a mop cleaning task, controlling the cleaning robot to move onto the first target base according to the respective movement strategy based on the type of the first target base and the first target task information includes:

controlling the cleaning robot to move backward onto the first target base.

Optionally, controlling the cleaning robot to move backward onto the first target base includes:

controlling, based on the first light rays, the cleaning robot to move towards the first target base in the advancing way;

adjusting the posture of the cleaning robot when the cleaning robot is at a third preset distance from the first target base, so that the centerline of the cleaning robot is roughly aligned with the centerline of the first target base;

controlling the cleaning robot to rotate by 180°; and controlling the cleaning robot to continue moving towards the first target base in the retreating way, and continuing to adjust the posture of the cleaning robot based on the second light rays during the movement of the cleaning robot, so that the centerline of the cleaning robot is precisely aligned with the centerline of the first target base, until the cleaning robot moves onto the first target base.

Optionally, after controlling the cleaning robot to move backward onto the first target base, the method further includes;

controlling the cleaning robot to carry out in-place detection when receiving an in-place detection signal sent by the first target base; and controlling the cleaning robot to communicate with the first target base when the in-place detection of the cleaning robot is successful.

Optionally, after controlling the cleaning robot to move backward onto the first target base, the method further includes:

in a case that no in-place detection signal sent by the first target base is received and the cleaning robot carries out in-place detection, controlling the cleaning robot to move onto the first target base again in the retreating way after moving out of the first target base in the advancing way, and repeating the above steps several times, or until the cleaning robot receives the in-place detection signal sent by the first target base before the in-place detection carried out by the cleaning robot.

Optionally, controlling, based on the type of the first target base and the first target task information, the cleaning robot to move onto the first target base according to the respective movement strategy further includes:

if the cleaning robot is trapped in the process of controlling the cleaning robot to move backward onto the first target base, controlling the cleaning robot to execute an escape strategy, until the cleaning robot escapes; and after the cleaning robot escapes, controlling the cleaning robot to continue to move backward until it moves onto the first target base.

Optionally, controlling, based on the type of the first target base and the first target task information, the cleaning robot to move onto the first target base according to the respective movement strategy further includes:

ignoring a triggering signal generated by a front impact structure of the cleaning robot in the process of controlling the cleaning robot to move onto the first target base;

if the triggering signal generated by the front impact structure of the cleaning robot is detected in the process of controlling the cleaning robot to move out of the first target base in the advancing way, controlling the cleaning robot to stop moving, and controlling the cleaning robot to carry out a next preset action; and controlling the cleaning robot to move onto the first target base again in the retreating way after the cleaning robot finishes the next preset action.

Optionally, controlling, based on the type of the first target base and the first target task information, the cleaning robot to move onto the first target base according to the respective movement strategy further includes:

ignoring the triggering signal generated by the cliff sensor at the middle and front part of the bottom surface of the cleaning robot in the process of controlling the cleaning robot to move backward onto the first target base, and receiving the triggering signal generated by the cliff sensor at the rear part of the bottom surface of the cleaning robot within the second preset movement distance.

Optionally, controlling, based on the type of the first target base and the first target task information, the cleaning robot to move onto the first target base further includes:

storing the state in suspension of the cleaning robot when the cleaning robot suspends the action of moving backward onto the first target base; and when an instruction to continue moving is received, the second light rays are not received, and the drive wheel drop sensor of the cleaning robot is not triggered, or when the cleaning device enters a sleeping state and the drive wheel drop sensor of the cleaning robot is not triggered, continuing to ignore the triggering signal generated by the shielded cliff sensor, and controlling the cleaning robot to continue to move onto the first target base with the state in suspension.

In a second aspect, an embodiment of the present disclosure provides a method for controlling a cleaning robot to move out of a base, including:

determining a type of a second target base and second target task information, where the second target base is a base being currently docked with the cleaning robot, and the second target task information is information about the task performed by the cleaning robot on the second target base; and controlling, based on the type of the second target base and the second target task information, the cleaning robot to move out of the second target base according to a respective move-out strategy.

Optionally, determining the type of the second target base includes:

acquiring a third base type; and determining the third base type to be the type of the second target base, where the third base type is a base type stored by the cleaning robot.

Optionally, the method further includes:

receiving a communication signal sent by the second target base in the process of controlling the cleaning robot to move out of the second target base according to the respective move-out strategy, determining whether the base type carried in the communication signal is the same as the third base type, and controlling the cleaning robot to continue moving with the current move-out strategy if the base type carried in the communication signal is the same as the third base type; and controlling the cleaning robot to move according to a compatible move-out strategy if the base type carried in the communication signal is different from the third base type.

Optionally, in a case that the type of the second target base is a charging base with charging function only or a charging base with dust collecting function, and the second target task information indicates a charging task and/or a dust collecting task, the move-out strategy indicates that the cleaning robot retreats a distance corresponding to the type of the second target base, and the compatible move-out strategy indicates that the cleaning robot retreats a third preset movement distance.

Optionally, the method further includes:

ignoring the triggering signal generated by the cliff sensor at the front part of the bottom surface of the cleaning robot in the process of controlling the cleaning robot to retreat and move out of the second target base, and ignoring the triggering signal generated by the cliff sensors at the middle and rear part of the bottom surface of the cleaning robot within a fourth preset movement distance.

Optionally, the method further includes:

storing, when the cleaning robot suspends the action of retreating and moving out of the second target base, a state in suspension of the cleaning robot;

when an instruction to continue moving is received, third light rays are not received, and a drive wheel drop sensor of the cleaning robot is not triggered, or when the cleaning robot enters a sleeping state and the drive wheel drop sensor of the cleaning robot is not triggered, continuing to ignore the triggering signal generated by the shielded cliff sensor, and controlling the cleaning robot to continue to move out of the second target base with the state in suspension, where the third light rays are the light rays emitted by the indication lamp located at the centerline of the second target base; and monitoring all the sensing portions of the cleaning robot according to a preset monitoring mode when the drive wheel drop sensor of the cleaning robot is triggered.

Optionally, in a case that the type of the second target base is a charging base with mop cleaning function, and the second target task information indicates a mop cleaning task, the move-out strategy indicates that the cleaning robot advances a distance corresponding to the type of the second target base, and the compatible move-out strategy indicates that the cleaning robot advances a fifth preset movement distance.

Optionally, the method further includes:

ignoring the triggering signal generated by the cliff sensor at the middle and rear part of the bottom surface of the cleaning robot in the process of controlling the cleaning robot to advance and move out of the second target base, and ignoring the triggering signal generated by the cliff sensor at the front part of the bottom surface of the cleaning robot within a sixth preset movement distance.

Optionally, the method further includes:

storing the state in suspension of the cleaning robot when the cleaning robot suspends advancement and movement out of the second target base;

when an instruction to continue moving is received, the third light rays are not received, and the drive wheel drop sensor of the cleaning robot is not triggered, or when the cleaning robot enters a sleeping state and the drive wheel drop sensor of the cleaning robot is not triggered, continuing to ignore the triggering signal generated by the shielded cliff sensor, and controlling the cleaning robot to continue to move out of the second target base with the state in suspension, where the third light rays are the light rays emitted by the indication lamp located at the centerline of the second target base; and monitoring all the sensing portions of the cleaning robot according to a preset monitoring mode when the drive wheel drop sensor of the cleaning robot is triggered.

In a third aspect, an embodiment of the present disclosure provides a cleaning robot, which includes a walking component, a cleaning component, and a controller, where the controller is configured to perform the above method for controlling the cleaning robot to return to the base and/or the above method for controlling the cleaning robot to move out of the base.

In a fourth aspect, an embodiment of the present disclosure provides an apparatus for controlling a cleaning robot to return to a base, including:

a first determination module configured to determine a type of a first target base and first target task information, where the first target base is a base to be docked with the cleaning robot, and the first target task information is information related to the task that needs to be performed by the cleaning robot for returning to the first target base; and a first control module configured to control, based on the type of the first target base and the first target task information, the cleaning robot to move onto the first target base according to a respective movement strategy.

In a fifth aspect, an embodiment of the present disclosure provides an apparatus for controlling a cleaning robot to move out of a base, including:

a second determination module configured to determine a type of a second target base and second target task information, where the second target base is a base being currently docked with the cleaning robot, and the second target task information is information about the task performed by the cleaning robot on the second target base; and a second control module configured to control, based on the type of the second target base and the second target task information, the cleaning robot to move out of the second target base according to a respective move-out strategy.

In a sixth aspect, an embodiment of the present disclosure provides a cleaning robot, which includes a walking component, a cleaning component, and a controller, where the controller is configured to perform the above method for controlling the cleaning robot to return to the base and/or the above method for controlling the robot to move out of the base.

In a seventh aspect, an embodiment of the present disclosure provides an electronic device, which includes a processor and a memory. The memory is used to store at least one executable instruction, which causes the processor to carry out the steps in the above method for controlling the cleaning robot to return to the base and/or the above method for controlling the robot to move out of the base.

In an eighth aspect, an embodiment of the present disclosure provides a computer-readable storage medium for storing computer program instructions. The computer program instructions, when called and executed by a processor, implement the steps in the above method for controlling the cleaning robot to return to the base and/or the above method for controlling the robot to move out of the base.

The embodiments of the present disclosure provide a cleaning robot and a method and apparatus for the cleaning robot to return to and move out of a base. The method enables to control the cleaning robot to move onto or out of a target base with respective movement strategies according to the type of the target base and the target task information, thus reducing the risk of the cleaning robot being stuck by the base and unable to move out or the cleaning robot being incapable of moving onto the base.

BRIEF DESCRIPTION OF THE DRAWINGS

The following accompanying drawings of the present disclosure are hereby used to understand the present disclosure as part of the embodiments of the present disclosure. The embodiments of the present disclosure and their descriptions are shown in the accompanying drawings to explain the principle of the present disclosure.

In the accompanying drawings.

DETAILED DESCRIPTION OF THE EMBODIMENTS

In the following description, various particular details are given in order to provide a more thorough understanding of the present disclosure. However, it will be apparent to those skilled in the art that the present disclosure may be implemented without one or more of these details. In other examples, some well-known technical features in the art are not described in order to avoid confusing the present disclosure.

It should be noted that the terms used here are for describing particular embodiments only, and are not intended to limit exemplary embodiments according to the present disclosure. As used herein, the singular forms are intended to include the plural forms as well, unless the context clearly indicates otherwise. In addition, it should also be understood that the terms "contain" and/or "include", when used in this specification, specify the presence of the stated features, integers, steps, operations, elements and/or components, but do not exclude the presence or addition of one or more other features, integers, steps, operations, elements, components and/or combinations thereof.

The exemplary embodiments according to the present disclosure will now be described in greater detail with reference to the accompanying drawings. However, these exemplary embodiments may be embodied in many different forms, and should not be construed as limited to the embodiments described herein. It should be understood that these embodiments are provided to make the description of the present disclosure thorough and complete, and to fully convey the idea of these exemplary embodiments to those of ordinary skills in the art.

Definition of terms: self-cleaning includes robot dust removal (dust bucket cleaning), mop washing, etc; a drive module includes a drive wheel drive component 141, an edge brush drive component, a roller brush drive component, a mop drive component (if necessary, the mop on some machines is capable of vibrating, so there is also drive component), a fan drive motor, a water pump drive (an electric control water tank is used to evenly distribute water to the mop), and so on.

Figure 4:
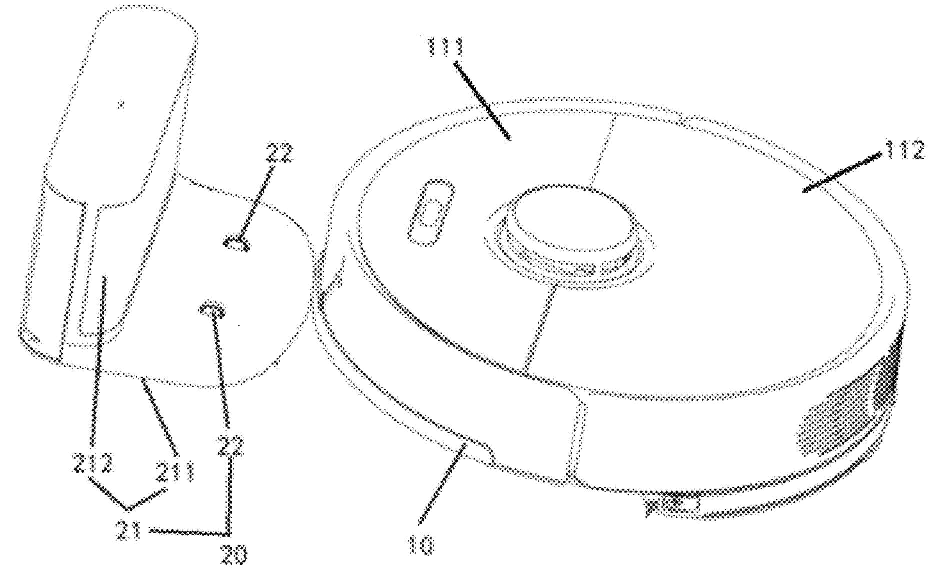
FIG. 4 is a scenario diagram according to an optional embodiment of the present disclosure.

As shown in FIG. 4, an embodiment of the present disclosure provides a possible application scenario, which includes a cleaning robot 10 and a base. Particularly, the cleaning robot 10 includes, but not limited to, a sweeping robot, a mopping robot, a sweeping and mopping integrated robot, a vacuum cleaner, and the like. The cleaning robot 10 usually uses host keys, application programs, etc., so that the cleaning robot 10 is controlled to travel on an intended cleaning path to carry out respective functional operations.

Figure 1:
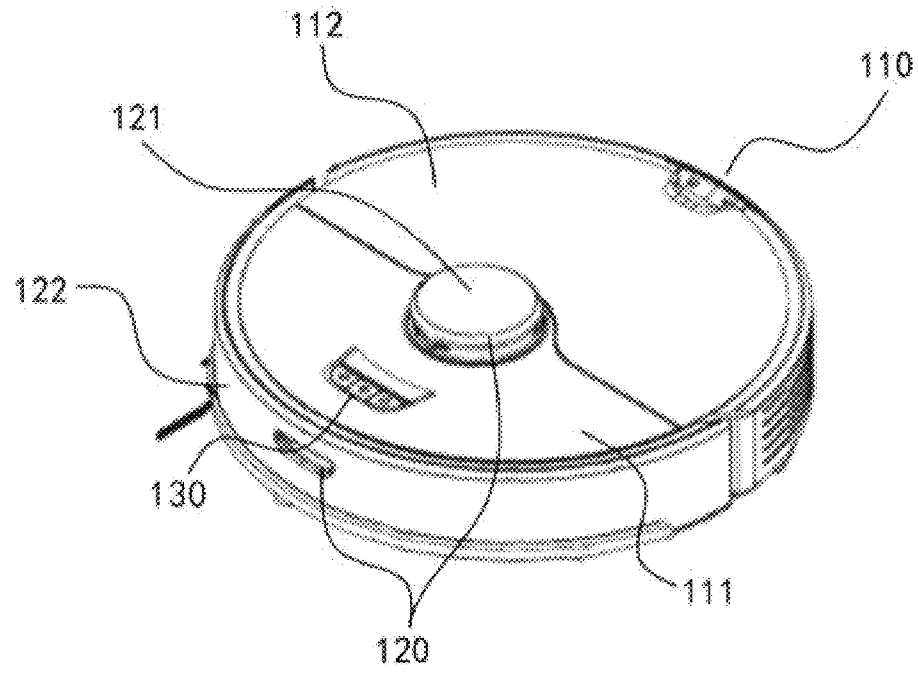
FIG. 1 is a perspective schematic diagram of a cleaning robot according to an optional embodiment of the present disclosure.
Figure 2:
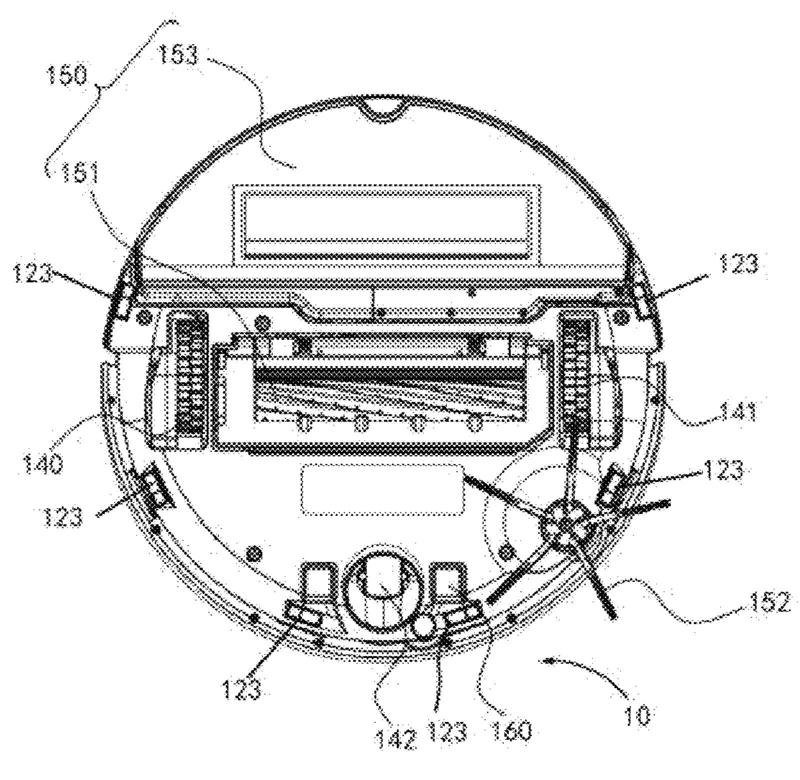
FIG. 2 is a schematic bottom view of FIG. 1.

Further, as shown in FIGS. 1 and 2, the cleaning robot 10 may include a machine body 110, a perception module 120, a controller, a drive module, a cleaning system 150, an energy system, and a human-computer interaction module 130. As shown in FIG. 1, the machine body 110 includes a front-facing portion 111 and a rear-facing portion 112, both of which may have an approximately circular shape (both front side and rear side are circular), and may also have other shapes, including, but not limited to, an approximately D-shaped shape in which the front side is square and the rear side is circular, and a rectangular or square shape in which both the front side and the rear side are square.

As shown in FIG. 1, the perception module 120 includes a position determination device 121 located on the machine body 110, a impact sensor disposed on the front impact structure 122 of the front-facing portion 111 of the machine body 110, a wall sensor located on the side of the machine, a cliff sensor 123 disposed at the lower part of the machine body 110, and a magnetometer, an accelerometer, a gyroscope, an odometer, and other sensing devices disposed inside the machine body 110 for providing the controller with various positional information and movement state information of the machine. The position determination device 121 includes, but not limited to, a camera, a Laser Distance Sensor (LDS). A signal transmitting/receiving device is also disposed on the machine body, which is used for the signal transmission with the respective device on the base. Particularly, the signal transmitting/receiving device is an infrared transmitting/receiving device, for example. The infrared transmitting/receiving device may include one or more infrared transmitters/receivers. It is noted that the signal transmitting/receiving device may also be a device that receives signals through wireless communication, including, but not limited to, Bluetooth, WiFi, etc. In some optional implementations, the position determination device 121 (such as a camera, a laser sensor) is located on the front side of the body 110, that is, the most frontal end of the front-facing portion 111, to more precisely sense the environment in front of the cleaning robot and achieve accurate positioning. Likewise, the infrared transmitting/receiving device is also disposed on the front side of the body, that is, the most frontal end of the front-facing portion 111, so that the cleaning robot can smoothly receive the signal sent by the base.

As shown in FIG. 1, the front-facing portion 111 of the machine body 110 may bear the front impact structure 122. When a drive wheel module 141 pushes the cleaning robot 10 to walk on the ground while cleaning, the front impact structure 122 may detect one or more events in the travelling path of the cleaning robot 10 by the sensor system disposed thereon, such as an impact sensor or a proximity sensor (infrared sensor). The cleaning robot 10 may respond to the event(s), such as obstacle and wall, detected by the front impact structure 122, by controlling the drive module, such as moving away from the obstacle to perform an obstacle avoidance operation.

The controller is disposed on the circuit board in the machine body 110, including a computing processor, such as a central processing unit and an application processor, communicating with a non-transitory memory, such as hard disk, flash memory, and random access memory. The application processor generates a real-time map of the environment where the cleaning robot 10 is located according to the obstacle information fed back by the laser distance measuring device by using a positioning algorithm, for example, Simultaneous Localization and Mapping (SLAM). In combination with the distance information and speed information fed back by the sensing devices disposed on the front impact structure 122, such as sensor, cliff sensor 123, magnetometer, accelerometer, gyroscope, and odometer, the application processor may comprehensively determine the current working state and position of the cleaning robot 10, as well as the current posture of the cleaning robot 10, such as crossing over the threshold, climbing onto the carpet, and being located at the cliff, the upper or lower part being stuck, the dust box being full, being picked up, etc., and also will give particular next-action strategies for different situations, so that the cleaning robot 10 has better cleaning performance and user experience.

As shown in FIG. 2, the drive module may manipulate the machine body 110 to travel across the ground based on a drive command with distance and angle information. The drive module contains a main drive wheel module, which may control the left wheel 140 and the right wheel 141. In order to control the movement of the machine more precisely, it is beneficial that the main drive wheel module includes a left drive wheel module and a right drive wheel module respectively. The left and right drive wheel modules are disposed along the transverse axis defined by the machine body 110. In order to enable the cleaning robot 10 to move more stably on the ground or have stronger movement ability, the cleaning robot 10 may include one or more driven wheels 142, which include, but not limited to, universal wheels. The main drive wheel module includes a drive motor and a control circuit for controlling the drive motor. The main drive wheel module may also be connected with a circuit for measuring drive current and an odometer. In addition, the left wheel 140 and the right wheel 141 may have a bias dropping suspension system, which is movably fastened, such as rotatably attached, to the machine body 110, and receives the spring bias downward and away from the machine body 110. The spring bias allows the drive wheel to maintain contact and traction with the ground with a certain landing force, and in the meantime, the cleaning element of the cleaning robot 10 also contacts the ground with a certain pressure.

The energy system includes a rechargeable battery, such as nickel hydrogen battery and lithium battery. The rechargeable battery may be connected with a charging control circuit, a battery pack charging temperature detection circuit, and a battery undervoltage monitoring circuit. The charging control circuit, the battery pack charging temperature detection circuit, and the battery undervoltage monitoring circuit are in turn connected with a single-chip microcomputer control circuit. A host is connected to a charging pile for charging through a charging electrode 160 disposed on the side of or below the machine body.

The human-computer interaction module 130 includes keys on the host panel for the user to select functions. The human-computer interaction module 130 may further include a display screen and/or an indication lamp and/or a horn, which show the user the current mode or functional options of the machine. The human-computer interaction module 130 may further include mobile phone client programs. For an automatic cleaning robot 10 of path navigation type, the mobile phone client may show the user the map of the environment where the machine is located and the position of the machine, which provides the user with more rich and user-friendly functional options. Particularly, the cleaning robot has multiple modes, such as working mode, self-cleaning mode, etc. The working mode refers to a mode in which the cleaning robot carries out an automatic cleaning operation. The self-cleaning mode refers to a mode in which the cleaning robot removes dirt on the roller brush and the side brush 152 on the base, and automatically collects dirt, and/or automatically cleans and dries the mop.

The cleaning system 150 may be a dry cleaning system 151 and/or a wet cleaning system 153.

As shown in FIG. 2, the dry cleaning system 151 provided by an embodiment of the present disclosure may include a roller brush, a dust box, a fan, and an air outlet. The roller brush, which has certain interference with the ground, sweeps the garbage on the ground and rolls it to the front of the dust suction port between the roller brush and the dust box, and then the garbage is sucked into the dust box through the gas with a suction force generated by the fan and passing through the dust box. The dry cleaning system 151 may further include a side brush 152 having a rotation axis that is angled relative to the ground for moving debris into the roller brush area of the cleaning system 150.

Figure 3:
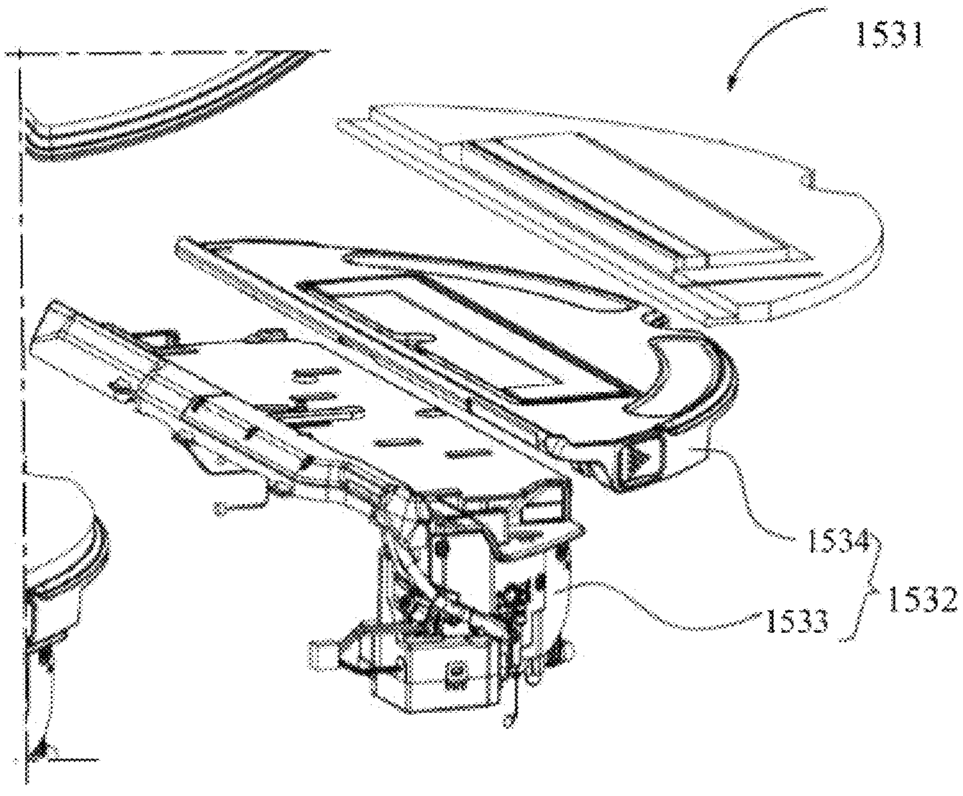
FIG. 3 is a structural diagram of a cleaning head.

As shown in FIGS. 2 and 3, the wet cleaning system 153 provided by an embodiment of the present disclosure may include: a cleaning head 1531, a drive unit 1532, a water delivery mechanism, a liquid storage tank, etc. The cleaning head 1531 may be disposed below the liquid storage tank. The cleaning liquid inside the liquid storage tank is transmitted to the cleaning head 1531 through the water delivery mechanism, so that the cleaning head 1531 can perform wet cleaning on the surface to be cleaned. In other embodiments of the present disclosure, the cleaning liquid inside the liquid storage tank may also be directly sprayed to the surface to be cleaned, and the cleaning head 1531 may clean the surface by evenly smearing the cleaning liquid.

The cleaning head 1531 is used to clean the surface to be cleaned. The drive unit 1532 is used to drive the cleaning head 1531 to substantially reciprocate along a target surface, which is a portion of the surface to be cleaned. The cleaning head 1531 reciprocates along the surface to be cleaned. The contact surface between the cleaning head 1531 and the surface to be cleaned is provided with a mop. The drive unit 1532 drives the mop of the cleaning head 1531 to reciprocate and produce high-frequency friction with the surface to be cleaned, thereby removing stains on the surface to be cleaned. Alternatively, the mop may be floating to always keep in contact with the surface to be cleaned during the cleaning process, without the drive unit 1532 driving the reciprocating motion thereof.

As shown in FIG. 3, the drive unit 1532 may further include a drive platform 1533 and a support platform 1534. The drive platform 1533 is connected to the bottom surface of the machine body 110 to provide a drive force. The support platform 1534 is detachably connected to the drive platform 1533 to support the cleaning head 1531, and may be lifted up and lowered down under the drive of the drive platform 1533.

The wet cleaning system 153 may be connected to the machine body 110 through an active lifting and lowering module. When the wet cleaning system 153 does not participate in the work temporarily, for example, when the cleaning robot 10 stops at the base to clean the cleaning head 1531 of the wet cleaning system 153 and fill the liquid storage tank with water, or a surface to be cleaned is encountered that cannot be cleaned by the wet cleaning system 153, the wet cleaning system 153 may be lifted up by the active lifting and lowering module.

As shown in FIG. 4, the base 20 includes a body 21, which includes a pedestal 211 and a stop side portion 212. The base 20 further includes a signal transmitting device for transmitting signals outwards. Particularly, the signal transmitting device is an infrared transmitting device, for example. The infrared transmitting device may include one or more infrared transmitting sources (for example, infrared transmitting diodes). The infrared transmitting source is used to transmit infrared signals outward. It is noted that the signal transmitting device may also be a device that transmits signals via wireless communication, including, but not limited to, Bluetooth, WiFi, etc.

In some embodiments, the base 20 has the charging function. Thus, the base 20 further includes two or more charging pole pieces 22, which may be aligned and contacted with the charging pole pieces disposed on the cleaning robot 10, thus providing the cleaning robot 10 with charging power.

In some other embodiments, in addition to the charging function, the base 20 has functions of dust collecting, mop cleaning or drying, etc. Accordingly, the base 20 is equipped with a dust collecting component, a mop cleaning component, or a drying component. The dust collecting component includes a cleaning mechanism, a dust sucking mechanism, and a dust collecting box. The cleaning mechanism is used to clean the roller brush of the cleaning robot 10. The dust collecting box is detachably disposed on the base 20. The dust sucking mechanism is disposed within the dust collecting box, and sucks the dirt removed from the roller brush of the cleaning robot 10 and/or the garbage in the dust box of the cleaning robot 10 into the dust collecting box.

The mop cleaning component includes a cleaning tank disposed on the base 20, and a scraping strip or a brush roller fixedly or movably disposed in the cleaning tank. The brush roller may be driven to rotate by the brush roller drive mechanism. The base 20 is equipped with a cleaning opening in communication with the cleaning tank. When the cleaning robot drives onto the base 20, the scraping strip or the brush roller forms interference contact with the mop, thereby cleaning the mop that extends into the cleaning tank. Furthermore, the mop cleaning component further includes a water delivery mechanism and a drainage mechanism which are in communication with the cleaning tank. The water delivery mechanism is used to deliver cleaning liquid into the cleaning tank, and the drainage mechanism is used to discharge the sewage generated after cleaning the mop.

The drying component includes a heating component disposed on the base 20 for heating and drying the cleaned mop, thereby improving the drying speed of the mop. The drying component may also include an air drying mechanism to speed up the drying of the mop by blowing in a distributed way.

It is noted that the functions of the above base 20 are only exemplary, and the base 20 may further include other auxiliary functions or the combination of the above functions. The functions of the base 20 are not strictly limited in the present embodiment.

Figure 10:
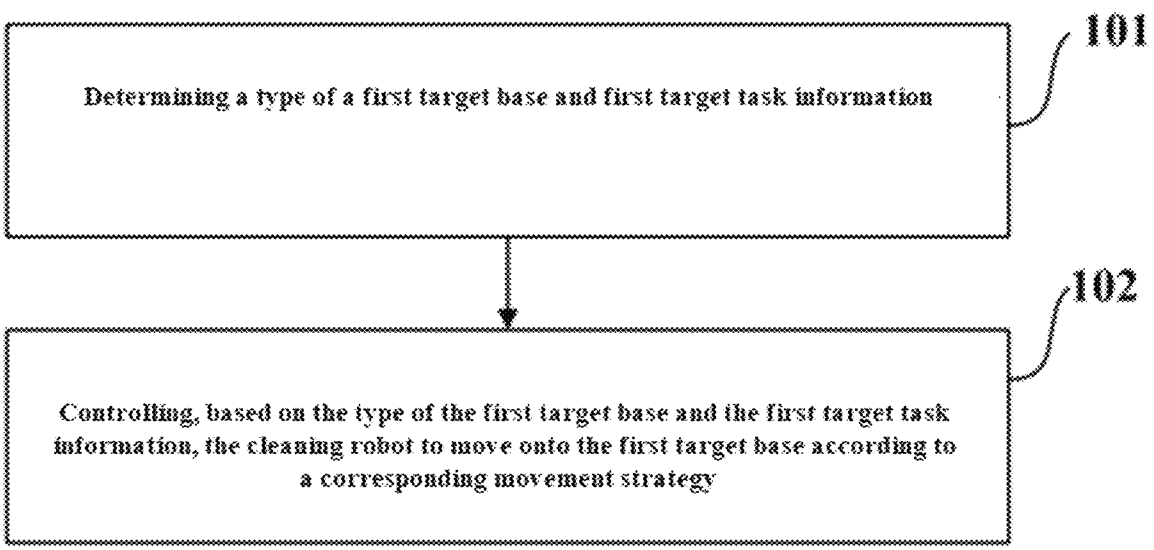
FIG. 10 is a flowchart of a method for controlling the cleaning robot to return to the base according to an optional embodiment of the present disclosure.

Based on the above application scenario, as shown in FIG. 10, an embodiment of the present disclosure provides a method for controlling a cleaning robot to return to a base, including the following steps:

Step S101: determining a type of a first target base and first target task information, where the first target base is a base to be docked with the cleaning robot 10, and the first target task information is information related to the task that needs to be performed by the cleaning robot 10 for returning to the first target base.

In particular applications, a cleaning robot 10 may be configured with multiple bases with different functions, and may also be configured with one base. The number of the bases configured for the cleaning robot 10 is not strictly limited in the present embodiment. However, in a case that a cleaning robot 10 is configured with more than two bases, the cleaning robot 10 will only dock with one of the bases at a time, that is, the first target base in this step, and the first target base matches the first target task information. For example, the first target task information indicates a mop cleaning task, and the first target base is a base with at least the mop cleaning function. It is noted that the first target base may also have other functions, such as charging. If all the bases have the function of carrying out the target task, then the cleaning robot 10 may select the base closest to the current position thereof as the first target base, or select the base according to a preset priority. For example, if the preset priority is, from high to low, the base of which the cleaning robot 10 moved out last time, the base with more functions, and the base with a single function, then the cleaning robot 10 first selects the base of which the cleaning robot 10 moved out last time. If the base of which the cleaning robot 10 moved out last time does not exist, the base with more functions is selected, and so on. Thus, the first target base can be determined.

The first target task information may be sent to the cleaning robot 10 by the user utilizing the host keys and applications etc., or automatically generated by the cleaning robot 10 when the preset condition is met. For example, when the battery level of the cleaning robot 10 is less than a preset battery level, the cleaning robot 10 automatically generates the first target task information for charging. Alternatively, when the cleanliness of the mop of the cleaning robot 10 is less than a preset cleanliness, the cleaning robot 10 automatically generates the first target task information for mop cleaning.

Step S102: controlling, based on the type of the first target base and the first target task information, the cleaning robot 10 to move onto the first target base according to a respective movement strategy.

According to a method provided by an embodiment of the present disclosure for the cleaning robot to return to the base, the method can control the cleaning robot 10 to move onto the first target base with a respective movement strategy according to different types of the first target base and the first target task information, thus reducing the risk that the cleaning robot 10 cannot move onto the base.

Particularly, in some embodiments, determining the type of the first target base in the step S101 includes the following steps:

Step S201: acquiring the mode in which the cleaning robot 10 moves onto the first target base and a starting point for the current movement of the cleaning robot 10.

The mode in which the cleaning robot 10 moves onto the first target base includes automatic mode and manual mode. The automatic mode indicates that the cleaning robot 10 moves onto the first target base autonomously, and the manual mode indicates that the user manually places the cleaning robot 10 onto the first target base. The current movement of the cleaning robot 10 refers to the whole movement process of the cleaning robot 10, from the cleaning robot 10 beginning to move and execute the work instruction after receiving it, to the cleaning robot 10 returning to the first target base. The starting point for the current movement of the cleaning robot 10 refers to a position where the cleaning robot 10 starts the current movement.

Step S202: acquiring a first base type and a second base type, when the cleaning robot 10 moves onto the first target base in the automatic mode, and the starting point for the current movement of the cleaning robot 10 is the base, where the first base type is the type of the base acting as the starting point for the current movement of the cleaning robot, and the second base is the type of the first target base determined during the movement of the cleaning robot 10 towards the first target base.

The starting point for the current movement of the cleaning robot 10 being the base means that the cleaning robot 10 moves out of the base and starts the current movement. After the cleaning robot 10 moves out of the base, the cleaning robot 10 may also return to the base, or return to other bases with the same type as the base, or return to other bases with different types from the base. That is, the first base type may be the same as or different from the second base type.

Step S203: determining the type of the first target base based on the first base type and the second base type.

Particularly, step S203 includes the following steps:

Step S2031: determining whether the first base type and the second base type are the same, performing step S2032 if the first base type is the same as the second base type, and performing step S2033 if the first base type is different from the second base type.

Step S2032: determining the first base type to be the type of the first target base.

Step S2033: determining the second base type to be the type of the first target base.

By way of example, if both the first base type and the second base type are charging bases with charging function only, then the type of the first target base is a charging base with charging function only. If the first base type is a charging base with charging function only, and the second base type is a charging base with dust collecting function, then the type of the first target base is a charging base with dust collecting function.

By comparing the first base type with the second base type, if the first base type is the same as the second base type, the cleaning robot 10 may immediately use the last movement strategy to move onto the first target base in a subsequent control process, so that the cleaning robot 10 does not need to look up a matching movement strategy, improving the efficiency of the cleaning robot 10 in determining the movement strategy.

Step S204: when the cleaning robot 10 moves onto the first target base in a manual mode, and the starting point for the current movement of the cleaning robot 10 is not the base, acquiring the second base type, and determining the second base type to be the type of the first target base.

The starting point for the current movement of the cleaning robot 10 being not the base means that the cleaning robot 10 does not move out of the base to start the current movement. In this case, the second base type is immediately determined to be the type of the first target base.

Step S205: determining whether the communication signal sent by the first target base is received when the cleaning robot 10 moves onto the first target base in a manual mode, performing step S206 if the communication signal sent by the first target base is received, and performing step S207 if no communication signal sent by the first target base is received.

Step S206: determining the base type carried in the communication signal to be the type of the first target base.

Step S207: determining the base type stored by the cleaning robot 10 to be the type of the first target base.

When the cleaning robot 10 is manually placed onto the first target base by the user, the first target base may realize communication signal transmission with the cleaning robot 10 through infrared or wireless communication, and the communication signal carries the type of the first target base. When the cleaning robot 10 receives the communication signal sent by the first target base, that is, when the communication is successful, the base type carried in the communication signal is determined to be the type of the first target base. For example, if the base type carried in the communication signal is a charging base with dust collecting function, the type of the first target base is a charging base with dust collecting function. When the cleaning robot 10 does not receive the communication signal sent by the first target base, that is, when the communication fails, the base type stored by the cleaning robot 10 is taken as the type of the first target base.

Step S208: storing the type of the first target base to update the base type stored by the cleaning robot 10.

By storing the type of the first target base, the type of the first target base can be retrieved when the cleaning robot 10 moves out of the first target base afterwards. Then, the cleaning robot 10 is controlled to move out of the first target base by looking up the movement strategy corresponding to the type of the first target base, without re-determining the type of the first target base.

Further, acquiring the second base type in the above step S202 includes the following steps:

Step S301: receiving light rays emitted by the signal lamp on the first target base.

Step S302: determining the second base type according to the light rays emitted by the signal lamp.

Particularly, the first target base is equipped with a plurality of signal lamps. Accordingly, the machine body of the cleaning robot 10 is also equipped with a light sensing member that can receive the light rays emitted by the signal lamp, and can convert the received light rays into an electrical signal and identify the code it represents. Different types of bases have different codes. Thus, the second base type may be determined according to the code. That is, the type of the first target base may be determined in the process of the cleaning robot 10 moving towards the first target base.

In order to improve the accuracy in determining the second base type, in some embodiments, by setting the position of the signal lamp on the base and the code converted by the light rays emitted by each signal lamp, the first target base can be roughly classified at a long distance, and then finely classified at a short distance. By way of example, the signal lamp includes far-field lamps located on both sides of the centerline of the base and a central seam lamp located on the centerline of the base. Particularly, the above step S301 includes the following steps:

Step S401: receiving first light rays, which are the light rays emitted by the far-field lamp, when the cleaning device is at a first preset distance from the first target base.

The first preset distance generally refers to the distance at which the light sensing member on the cleaning device can receive the first light rays.

Step S402: receiving second light rays, which are the light rays emitted by the central seam lamp, when the cleaning device moves near to the first target base.

It can be understood that the signal lamp forms a signal that can be identified by the robot through its position on the base and the light ray signal code. Therefore, the position of the signal lamp and the light ray code of the signal lamp in the exemplary description are not limiting, and those of ordinary skills in the art can expand according to the principle and function of the exemplary description.

Accordingly, in particular, the above step S302 includes the following steps:

Step S501: converting the first light rays to obtain a first code.

Figure 6:
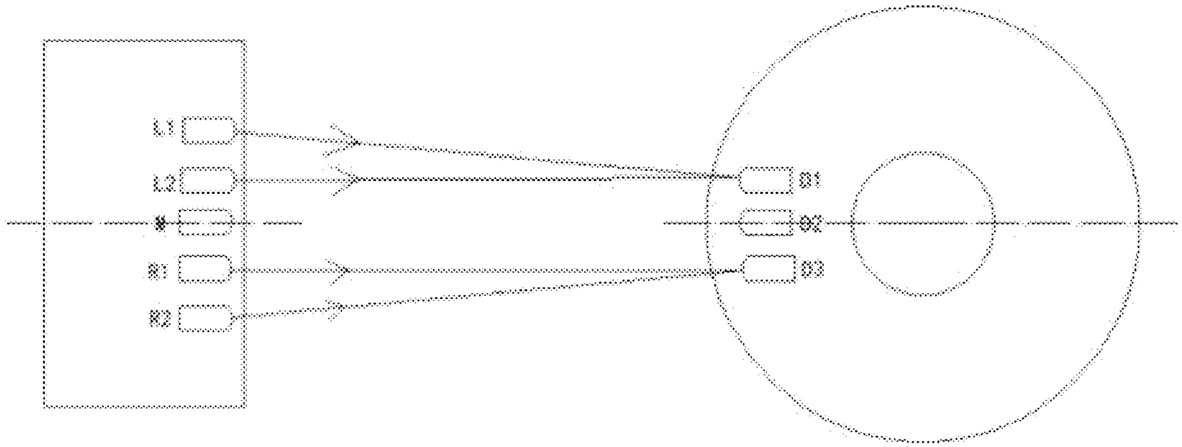
FIG. 6 is a schematic diagram of the alignment between the centerline of the cleaning robot and the centerline of the base in an optional embodiment of the present disclosure.

The first code is formed by adjusting the intensity of the first light rays and/or the order in which different far-field lamps emit light. By way of example, as shown in FIG. 6, taking four signal lamps as an example, the four signal lamps emit light rays A1, B1, C1, and D1 in order to form a code. The intensities of A1, B1, C1, and D1 may be the same, different, or partially the same. It is noted that the particular mode for light ray emission is not so limited, and the emission mode that can be realized in the art can be used.

Step S502: determining an initial type of the first target base based on the first code.

Particularly, the memory of the cleaning robot 10 stores the category of the base and the code corresponding to the category in advance. The controller of the cleaning robot 10 matches the first code with the pre-stored code. After looking up the preset code matching the first code, the controller retrieves the category corresponding to the preset code, and determines the category as the initial type of the first target base.

The category of the base may be divided and set by the staff themselves, and is not strictly limited in the present embodiment. For example, the category of the bases may include a charging base with charging function only, a charging base with dust collecting function only, and a charging base with two or more functions.

Each category may include a subcategory, and may not contain a subtype. For example, the two categories of a charging base with charging function and a charging base with dust collecting function only have no subtype; and a charging base with two or more functions has three subtypes of a charging base with dust collecting and mop cleaning functions, a charging base with mop cleaning and drying functions, and a charging base with dust collecting, mop cleaning and drying functions.

Step S503: determining whether the initial type includes a subtype, performing steps S504-S505 if the initial type includes a subtype, and performing step S506 if the initial type does not include a subtype.

Step S504: converting the second light rays to obtain a second code.

The second code may be formed by adjusting factors such as the intensity of the second light rays or the light emitting frequency. By way of example, the central seam lamp emits light rays with different intensities in a period of 5 s to form the second code. It is noted that the particular mode for light ray emission is not so limited, and the emission mode that can be realized in the art can be used.

Step S505: determining, based on the second code, the subtype to which the first target base belongs, and determining the subtype to be the second base type.

Step S506: determining the initial type to be the second base type.

Each subtype and the code corresponding to the subtype are also stored in the memory of the cleaning robot 10 in advance. After determining the initial type of the first target base, it is necessary to determine whether the initial type contains a subtype. If the initial type does not contain a subtype, for example, the initial type is a charging base with charging function only, then the second base type is a charging base with charging function only. If the initial type contains subtype(s), then the second code is matched with the pre-stored code. After looking up the matching code successfully, the respective subtype is determined to be the second base type.

In the present embodiment, the cleaning robot 10 may first determine the category to which the first target base belongs according to the code converted from the first light rays at a long distance while moving toward the first target base, so that the first target base is roughly classified. Then, when the cleaning robot moves near the first target base, it is determined whether the first target base belongs to a subcategory under the category through the second light rays, so that the first target base is precisely classified. In this way, the second light rays are less interfered by the environment at a close distance, thus rendering the determined type more accurate.

In particular applications, when the type of the first target base is a charging base with charging function only or a charging base with dust collecting function, and the first target task information indicates a charging task and/or a dust collecting task, the step S101 particularly includes:

Step S601: controlling the cleaning robot 10 to move forward onto the first target base.

Figure 5:
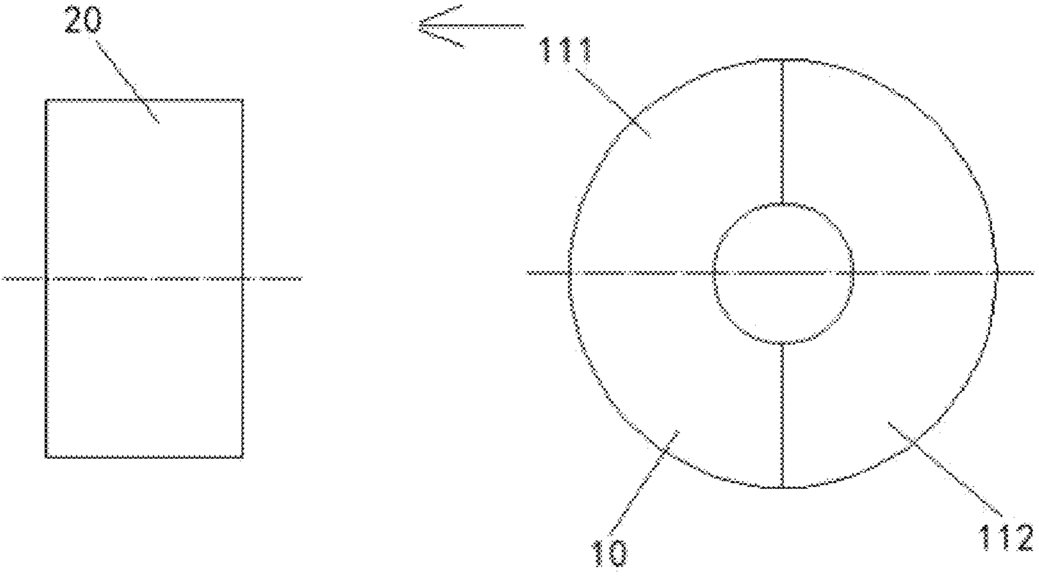
FIG. 5 is a schematic diagram of the cleaning robot moving forward onto a base in an optional embodiment of the present disclosure.

Forward movement means that the front-facing portion 111 of the cleaning robot 10 faces the first target base and moves towards the direction gradually approaching the first target base, see FIG. 5 for details.

In the present embodiment, when the cleaning robot 10 needs to be charged or clean the roller brush, or both, the cleaning robot 10 moves onto the first target base in a forward way.

Furthermore, in the process of controlling the cleaning robot 10 to move forward onto the first target base, during the stage of docking the cleaning robot 10 with the first target base, the triggering signal generated by the cliff sensor 123 at the middle and rear part of the bottom surface of the cleaning robot 10 is ignored, and when the cleaning robot 10 moves within the first preset movement distance, the triggering signal generated by the cliff sensor 123 at the front part of the bottom surface of the cleaning robot 10 is ignored.

As shown in FIG. 2, a plurality of cliff sensors 123 are disposed at different positions of the bottom surface of the cleaning robot 10, so as to detect whether there is a cliff on the surface to be cleaned around the cleaning robot 10. By way of example, there are six cliff sensors 123, which are divided into three groups, and each group has two cliff sensors 123. The three groups of cliff sensors 123 are arranged in turn from the front-facing portion 111 to the rear-facing portion 112, respectively. The cliff sensor 123 closest to the front end of the cleaning robot 10 is the cliff sensor 123 located at the front part of the bottom surface of the cleaning robot 10, and the remaining cliff sensors 123 are cliff sensors 123 located at the middle and rear part of the bottom surface of the cleaning robot 10.

When the cleaning robot 10 performs the cleaning operation, and after the cliff sensor 123 is triggered, the cleaning robot 10 will stop moving or turn to avoid the cliff. In the process of docking the cleaning robot 10 with the first target base, it is prone for the cliff sensor 123 to take the groove on the base as a cliff, thus causing the cleaning robot 10 to stop moving, thereby affecting the docking of the cleaning robot 10 with the first target base. Therefore, in the present embodiment, the triggering signal generated by the cliff sensor 123 at the middle and rear part of the bottom surface is ignored, so as to avoid the cliff sensor 123 at the middle and rear part from taking the groove on the base as a cliff, reducing the misjudgment rate of the cliff sensor 123. The cliff sensor 123 located at the front part of the bottom surface of the cleaning robot 10 is triggered after the cleaning robot 10 moves the first preset movement distance, which means that the cleaning robot 10 may encounter a real cliff. At this time, the cleaning robot 10 is controlled to give an alarm, so that the user is prompted to check the cleaning robot 10. The cliff sensor 123 at the front part of the bottom surface of the cleaning robot 10 is triggered when the cleaning robot 10 moves within the first preset movement distance, and then the triggering signal will still be ignored. This can not only reduce the influence of the cliff sensor 123 on docking, but also reduce the risk of the cleaning robot 10 falling from the real cliff. The first preset movement distance may be set by the staff themselves. For example, the first preset movement distance is set to 30 cm according to the overall size of the robot.

Particularly, step S601 includes:

Step S6011: controlling the cleaning robot 10 to move towards the first target base in an advancing way based on the first light rays.

Advancing means that the front-facing portion 111 of the cleaning robot 10 always faces the cleaning robot 10 and moves in the direction of gradually approaching the first target base.

The signal lamp in the above embodiments may be used as a pile searching lamp of the first target base, and the light sensing member on the cleaning robot 10 may determine the general orientation of the first target base by searching for the first light rays emitted by the remote lamp.

Step S6012: adjusting the posture of the cleaning robot 10 when the cleaning robot 10 is at a second preset distance from the first target base, so that the centerline of the cleaning robot 10 is roughly aligned with the centerline of the first target base.

In particular applications, the far-field lamps are symmetrically arranged with the centerline of the first target base being the symmetry axis. Accordingly, the light sensing portion of the cleaning robot 10 is symmetrically arranged with the centerline of the cleaning robot 10 being the symmetry axis. In this way, after the light rays of the remote lamp are received by the respective light sensing portion, it can be determined that the centerline of the cleaning robot 10 is roughly aligned with the centerline of the first target base.

For example, as shown in FIG. 6, the far-field lamp L1 is symmetrically arranged with the far-field lamp R1, the far-field lamp L2 is symmetrically arranged with the far-field lamp R2, and the light sensing portion D1 is symmetrically arranged with the light sensing portion D2. When the light sensing portion D1 receives the light rays emitted by the far-field lamp L1 and the far-field lamp L2, and the light sensing portion D2 receives the light rays emitted by the far-field lamp R1 and the far-field lamp R2, it indicates that the centerline of the cleaning robot 10 is roughly aligned with the centerline of the first target base.

If the light sensing portion D1 does not receive the light rays emitted by the far-field lamp L1 and the far-field lamp L2, or the light sensing portion D2 does not receive the light rays emitted by the far-field lamp R1 and the far-field lamp R2, it indicates that the centerline of the cleaning robot 10 is not roughly aligned with the centerline of the first target base, and the posture of the cleaning robot 10 needs to be adjusted, until the light sensing portion D1 receives the light rays emitted by the far-field lamp L1 and the far-field lamp L2, and the light sensing portion D2 receives the light rays emitted by the far-field lamp R1 and the far-field lamp R2.

The second preset distance may be set by the staff themselves, and different second preset distances may be set for charging and dust removing tasks.

Step S6013: controlling the cleaning robot 10 to continue moving towards the first target base in the advancing way, and continuing to adjust the posture of the cleaning robot 10 based on the second light rays during the movement of the cleaning robot 10, so that the centerline of the cleaning robot 10 is precisely aligned with the centerline of the first target base, until the cleaning robot 10 moves onto the first target base.

Particularly, as shown in FIG. 6, a light sensing portion D3 is disposed on the centerline of the cleaning sensor. If the light sensing portion D3 receives the light rays emitted from the central seam lamp M, it indicates that the centerline of the cleaning robot 10 is precisely aligned with the centerline of the first target base. If the light sensing portion D3 does not receive the light rays emitted from the central seam lamp M, it indicates that the centerline of the cleaning robot 10 is not precisely aligned with the centerline of the first target base, and the posture of the robot needs to be adjusted, so that the light sensing portion D3 receives the light rays emitted from the central seam lamp M, thus improving the accuracy of alignment.

Furthermore, as the cleaning robot 10 is getting closer and closer to the first target base, the speed of the cleaning robot 10 is getting lower and lower, thus improving the stability in docking between the cleaning robot 10 and the first target base.

Step S602: in a case that a docking signal is received, determining whether a continuous task triggering signal is received within a preset time period, performing step S603 if the continuous task triggering signal is received within the preset time period, and performing step S604 if the continuous task triggering signal is not received within the preset time period.

Step S603: determining that the cleaning robot 10 is successfully docked with the first target base.

Step S604: controlling the cleaning robot 10 to move onto the first target base again in an advancing way after moving out of the first target base in a retreating way, and repeating the step of determining whether continuous charging triggering signal is received within a preset time period, until the continuous task triggering signal is received within the preset time period.

By way of example, if a continuous triggering signal of the charging electrode is received within the preset time period, it indicates that the charging electrode 160 of the cleaning robot 10 has successfully contacted with the charging electrode of the first target base. If no continuous triggering signal of the charging electrode is received within the preset time period, it indicates that the charging electrode 160 of the cleaning robot 10 has not successfully contacted with the charging electrode of the first target base. Then, it is necessary to control the cleaning robot 10 to move out of the first target base and move onto the first target base again. After that, it is determined whether the continuous triggering signal of the charging electrode is received within the preset time period. If so, the process of moving out of the first target base and moving onto the first target base again is not repeated. If not, the process of moving out of the first target base and moving onto the first target base again is repeated, and so on, until the continuous task triggering signal is received within the preset time period, thereby improving the reliability in performing the first target task. Retreating means that the cleaning robot 10 moves in an opposite direction relative to advancing. That is, the cleaning robot 10 moves away from the first target base. The preset time period may be set by the staff themselves, and is not strictly limited in the present embodiment.

Further, step S101 further includes the following steps:

Step S701: storing, when the cleaning robot 10 suspends the action of moving forward onto the first target base, or when the cleaning robot 10 enters a sleeping state and a drive wheel drop sensor of the cleaning robot 10 is not triggered, a state in suspension of the cleaning robot 10.

Suspending movement of the cleaning robot 10 may be controlled by a user utilizing a host key, an application program, or the like. The state in suspension includes, but is not limited to, the position and posture of the cleaning robot 10 while suspending.

When the cleaning device is normally placed on the ground, the drive wheel part will retract into the machine body. When the cleaning robot 10 falls, the drive wheel will pop up and trigger the drive wheel drop sensor. In the present embodiment, if the drive wheel drop sensor is not triggered, it indicates that the cleaning device is still on the ground without moving onto the first target base.

Step S702: when an instruction to continue moving is received, the second light rays are received, and the drive wheel drop sensor of the cleaning robot 10 is not triggered, continuing to ignore the triggering signal generated by the shielded cliff sensor 123, and controlling the cleaning robot 10 to continue to move onto the first target base with the state in suspension.

After receiving the instruction to continue moving, the light sensing portion of the cleaning device may still sense the second light rays, and the drive wheel drop sensor is not triggered. This indicates that the cleaning device is still in the state of moving onto the first target base. Therefore, it is necessary to continue to ignore the triggering signal of the cliff sensor 123 according to the above embodiment and continue to move toward the first target base.

Further, when the type of the first target base is a charging base with mop cleaning function, and the first target task information indicates a mop cleaning task, step S101 further includes the following steps:

Step S801: controlling the cleaning robot 10 to move backward onto the first target base.

Figure 7:
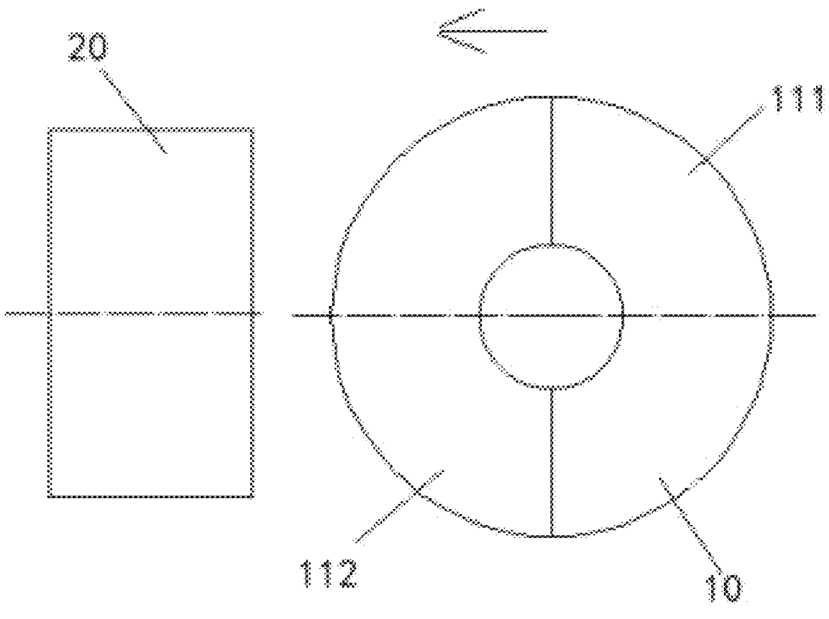
FIG. 7 is a schematic diagram of the cleaning robot moving backward onto the base in an optional embodiment of the present disclosure.

Backward movement means that the rear-facing portion 112 of the cleaning robot 10 faces the first target base and moves towards the direction gradually approaching the first target base, see FIG. 7 for details.

In the present embodiment, when the cleaning robot 10 needs to clean the mop, the cleaning robot 10 moves onto the first target base in a backward movement.

In the process of controlling the cleaning robot 10 to move backward onto the first target base, the triggering signal generated by the cliff sensor 123 at the middle and front part of the bottom surface of the cleaning robot 10 is ignored, and within the second preset movement distance, the triggering signal generated by the cliff sensor 123 located at the rear part of the bottom surface of the cleaning robot 10 is received.

The particular ways and principles may be the same as those in step S601, and will not be repeated here.

Particularly, step S801 includes the following steps:

Step S8011: controlling, based on the first light rays, the cleaning robot 10 to move towards the first target base in the advancing way.

This step is the same as step S6011 in the above embodiment, and will not be repeated here.

Step S8012: adjusting the posture of the cleaning robot 10 when the cleaning robot 10 is at a third preset distance from the first target base, so that the centerline of the cleaning robot 10 is roughly aligned with the centerline of the first target base.

This step is the same as step S6012 in the above embodiment, and will not be repeated here.

Step S8013: controlling the cleaning robot 10 to rotate by 180°.

The cleaning robot 10 rotates by 180°, so that the rear-facing portion 112 of the cleaning robot 10 faces the first target base. That is, the turning action of the cleaning robot 10 is realized.

Step S8014: controlling the cleaning robot 10 to continue moving towards the first target base in the retreating way, and continuing to adjust the posture of the cleaning robot 10 based on the second light rays during the movement of the cleaning robot 10, so that the centerline of the cleaning robot 10 is precisely aligned with the centerline of the first target base, until the cleaning robot 10 moves onto the first target base.

Retreating means that the rear-facing portion 112 of the cleaning robot 10 faces the first target base and moves towards the first target base.

This step only changes the advancing way in step S6013 of the above embodiment into the retreating way, and other parts may refer to S6013, and are not repeated in the present embodiment.

Step S802: controlling the cleaning robot 10 to carry out in-place detection when receiving an in-place detection signal sent by the first target base.

When receiving the in-place detection signal sent by the first target base, it indicates that the first target in-place detection switch has been triggered. Then, the cleaning robot 10 may also start the in-place detection to detect whether the cleaning robot 10 is successfully docked with the first target base.

Step S803: controlling the cleaning robot 10 to communicate with the first target base when the in-place detection of the cleaning robot 10 is successful.

The cleaning robot 10 communicates with the first target base to transmit signals to each other, so that the cleaning robot 10 can cooperate with the first target base to achieve the purpose of cleaning the mop.

Step S804: in a case that no in-place detection signal sent by the first target base is received and the cleaning robot 10 carries out the in-place detection, controlling the cleaning robot 10 to move onto the first target base again in the retreating way after moving out of the first target base in the advancing way, and repeating the above steps several times, or until the cleaning robot 10 receives the in-place detection signal sent by the first target base before the in-place detection is carried out by the cleaning robot.

The in-place detection of the cleaning robot 10 is triggered before the in-place switch of the first target base, that is, without receiving the in-place detection signal sent by the first target base, and the cleaning robot 10 starts the in-place detection. This means that there is a problem in docking between the cleaning robot 10 and the first target base. In this case, it is necessary to control the cleaning robot 10 to move out of the first target base, and move backward onto the first target base again, so that the cleaning robot 10 can dock with the first target base again. If it still happens that the in-place detection of the cleaning robot 10 is triggered before the in-place switch of the first target base, it is still necessary to control the cleaning robot 10 to move out of the first target base, and move backward onto the first target base again, and so on. The above steps are repeated several times, or until the cleaning robot 10 receives the in-place detection signal sent by the first target base before the in-place detection is carried out by the cleaning robot, thereby improving the success rate of docking between the cleaning robot 10 and the first target base.

Further, in another embodiment, step S101 further includes the following steps:

Step S901: in the process of controlling the cleaning robot 10 to move backward onto the first target base, controlling the cleaning robot 10 to execute an escape strategy if the cleaning robot 10 is trapped, until the cleaning robot 10 escapes.

Particularly, if the cleaning robot 10 does not move at the same position within a certain time period, it can be determined that the cleaning robot 10 is trapped. When the cleaning robot 10 is trapped, the cleaning robot 10 is controlled to enter the escape mode, such as by increasing the speed of the drive wheel, etc., so that the cleaning robot 10 can escape.

Step S902: after the cleaning robot 10 escapes, controlling the cleaning robot 10 to continue to move backward, until it moves onto the first target base.

Steps S901 and S902 enable the cleaning robot 10 to automatically escape, avoiding the situation that the cleaning robot 10 cannot move onto the first target base due to being trapped.

Further, in the above embodiment, step S101 further includes:

Step S1001: ignoring the triggering signal generated by a front impact structure of the cleaning robot 10 in the process of controlling the cleaning robot 10 to move onto the first target base.

When the cleaning robot 10 is carrying out the cleaning operation, the cleaning robot 10 will stop moving after the front impact structure is triggered. While in the process of controlling the cleaning robot 10 to move onto the first target base, the triggering signal of the front impact structure is ignored, thus avoiding influences on the movement of the cleaning robot 10.

Step S1002: in the process of controlling the cleaning robot 10 to move out of the first target base in the advancing way, if the triggering signal generated by the front impact structure of the cleaning robot 10 is detected, controlling the cleaning robot 10 to stop moving, and controlling the cleaning robot 10 to carry out a next preset action.

Advancing means that the front-facing portion 111 of the cleaning robot 10 is facing away from the first target base, and moving away from the first target base.

In the process of the cleaning robot 10 moving out of the first target base, if the front impact structure is triggered, it indicates that the cleaning robot 10 encounters an obstacle in the front. Thus, the cleaning robot 10 is controlled to stop moving and enter a preset action, where the next preset action may be an obstacle avoidance action, such as stopping moving.

Step S1003: controlling the cleaning robot 10 to move onto the first target base again in the retreating way after the cleaning robot 10 finishes the next preset work.

When the cleaning robot 10 moves out of the first target base and moves onto the first target base again, the cleaning robot 10 can avoid obstacles according to the triggering signal of the front impact structure, and continue to move onto the first target base again, thus reducing the impact of the triggering of the front impact structure on the movement of the cleaning robot 10.

Further, in the above embodiment, step S101 further includes:

Step S1101: storing the state in suspension of the cleaning robot 10 when the cleaning robot 10 suspends the action of moving backward onto the first target base.

Details about this step may refer to step S701, and will not be repeated here.

Step S1102: when an instruction to continue moving is received, the second light rays are not received, and the drive wheel drop sensor of the cleaning robot 10 is not triggered, or when the cleaning robot 10 enters a sleeping state and the drive wheel drop sensor of the cleaning robot 10 is not triggered, continuing to ignore the triggering signal generated by the shielded cliff sensor 123, and controlling the cleaning robot 10 to continue to move onto the first target base with the state in suspension.

Details about this step may refer to step S702, and will not be repeated here.

Figure 11:
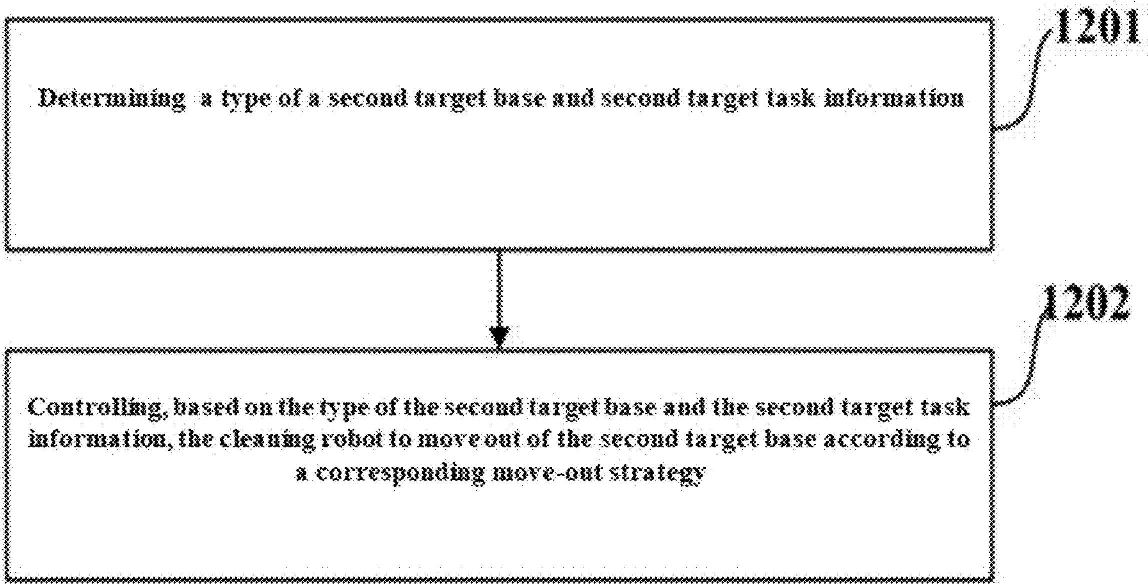
FIG. 11 is a flowchart of a method for controlling the cleaning robot to move out of the base according to an optional embodiment of the present disclosure.

Based on the above application scenario, as shown in FIG. 11, an embodiment of the present disclosure provides a method for controlling a cleaning robot to move out of a base, including:

Step S1201: determining a type of a second target base and second target task information, where the second target base is a base being currently docked with the cleaning robot 10, and the second target task information is information about the task performed by the cleaning robot 10 on the second target base.

The second target task information may be sent to the cleaning robot 10 by the user utilizing host keys and applications, or automatically generated by the cleaning robot 10 when the preset condition is met. For example, when the battery level of the cleaning robot 10 is less than the preset battery level, the cleaning robot 10 automatically generates the first target task information for charging. Alternatively, when the cleanliness of the mop of the cleaning robot 10 is less than a preset cleanliness, the cleaning robot 10 automatically generates the first target task information for mop cleaning.

Step S1202: controlling, based on the type of the second target base and the second target task information, the cleaning robot 10 to move out of the second target base according to a respective move-out strategy.

A method for the cleaning robot 10 to move out of the base provided according to an embodiment of the present disclosure can control the cleaning robot 10 to move out of the first target base with a respective movement strategy according to different types of the first target base and the first target task information, thus reducing the risk of the cleaning robot 10 being stuck by the base.

Particularly, determining the type of the second target base in the step S1201 includes:

Step S12011: acquiring a third base type.

The third base type is the base type stored by the cleaning robot. Particular determination process of the third base type may refer to steps S201-S208, and will not be repeated here.

Step S12012: determining the third base type to be the type of the second target base.

Further, the method further includes:

Step S1301: in the process of controlling the cleaning robot 10 to move out of the second target base according to the respective move-out strategy, receiving the communication signal sent by the second target base, and determining whether the base type carried in the communication signal is the same as the third base type, and controlling the cleaning robot 10 to continue moving with the current move-out strategy if the base type carried in the communication signal is the same as the third base type.

In the process that the cleaning robot 10 moves out of the second target base according to the respective move-out strategy, the third base type is determined again by matching and comparing the base type carried by the communication signal of the second target base with the third base type, so as to ensure that the move-out strategy is suitable for the second target base.

Step S1302: controlling the cleaning robot to move according to a compatible move-out strategy, if the base type carried in the communication signal is different from the third base type.

The compatible move-out strategy refers to a strategy for moving out from all types of second target bases. The base type carried in the communication signal being different from the third base type indicates that the third base type may not be the type of the second target base. Therefore, it is possible to move out of the second target base according to the compatible move-out strategy, so as to improve the success rate in moving-out.

Further, when the type of the second target base is a charging base with charging function only or a charging base with dust collecting function, and the second target task information indicates a charging task and/or dust collecting task, the move-out strategy indicates that the cleaning robot 10 retreats a distance corresponding to the type of the second target base, and the compatible move-out strategy indicates that the cleaning robot 10 retreats a third preset movement distance.

Figure 8:
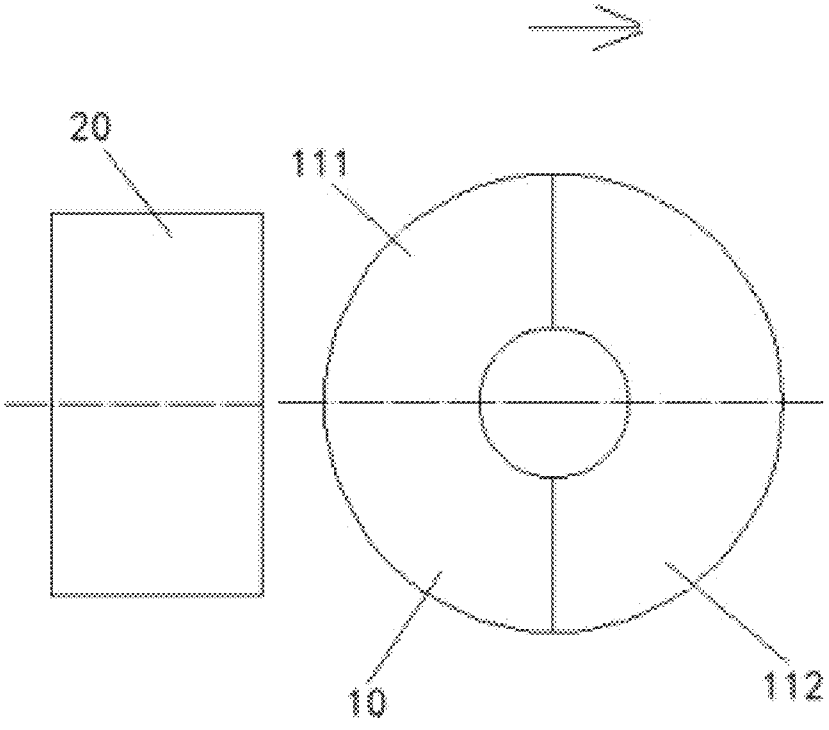
FIG. 8 is a schematic diagram of the cleaning robot moving out of the base in a retreating way in an optional embodiment of the present disclosure.

Before finishing the charging task and/or the dust collecting task at the second target base, the cleaning robot 10 needs to move onto the second target base in a forward direction. The particular movement mode may refer to the above embodiment. As such, as shown in FIG. 8, the cleaning robot 10 needs to move out of the second target base in a retreating way. By retreating, it means that the front-facing portion 111 of the cleaning robot 10 faces the second target base, and moves away from the first target base.

Each type of base corresponds to a different retreating distance, and the respective retreating distance is determined based on the type of the base. For the compatible move-out strategy, it is required to have a distance that is suitable for moving out of all types of bases, that is, the maximum distance, i.e., the third preset movement distance, which may be set by the staff according to the type of the base, and is not strictly limited in the present embodiment.

Further, the method further includes:

Ignoring the triggering signal generated by the cliff sensor 123 at the front part of the bottom surface of the cleaning robot 10 in the process of controlling the cleaning robot 10 to retreat and move out of the second target base, and ignoring the triggering signal generated by the cliff sensor 123 at the middle and rear part of the bottom surface of the cleaning robot 10 within a fourth preset movement distance.

As shown in FIG. 2, a plurality of cliff sensors 123 are disposed at different positions of the bottom surface of the cleaning robot 10, so as to detect whether there is a cliff on the surface to be cleaned around the cleaning robot 10. By way of example, there are six cliff sensors 123, which are divided into three groups, and each group has two cliff sensors 123. The three groups of cliff sensors 123 are arranged in turn from the front-facing portion 111 to the rear-facing portion 112, respectively. The cliff sensor 123 closest to the front end of the cleaning robot 10 is the cliff sensor 123 located at the front part of the bottom surface of the cleaning robot 10, and the remaining cliff sensors 123 are cliff sensors 123 located at the middle and rear part of the bottom surface of the cleaning robot 10.

When the cleaning robot 10 performs the cleaning operation, and after the cliff sensor 123 is triggered, the cleaning robot 10 will stop moving. In the process of the cleaning robot 10 retreating and moving out of the second target base, it is prone to take the height difference between the second target base and the ground as a cliff, thus causing the cleaning robot 10 to stop moving, thereby affecting the docking of the cleaning robot 10 with the first target base. Therefore, in the present embodiment, the triggering signal generated by the cliff sensor 123 at the front part of the bottom surface of the cleaning robot 10 is ignored, so as to avoid the cliff sensor 123 at the front part from taking the height difference between the second target base and the ground as a cliff, reducing the misjudgment rate of the cliff sensor 123. The cliff sensor 123 located at the middle and rear part of the bottom surface of the cleaning robot 10 is triggered after the cleaning robot 10 moves a fourth preset movement distance, which indicates that the cleaning robot 10 may encounter a real cliff. At this time, the cleaning robot 10 is controlled to give an alarm, so that the user is prompted to check the cleaning robot 10. The cliff sensor 123 at the middle and rear part of the bottom surface of the cleaning robot 10 is triggered when the cleaning robot 10 moves within the fourth preset movement distance, and the triggering signal will still be ignored. This can not only reduce the influence of the cliff sensor 123 on the moving-out action, but also reduce the risk of the cleaning robot 10 falling from the real cliff. The fourth preset movement distance may be set by the staff themselves, and is not strictly limited in the present embodiment.

Further, the method further includes:

Step S1401: storing, when the cleaning robot 10 suspends the action of retreating and moving out of the first target base, a state in suspension of the cleaning robot 10.

Suspending movement of the cleaning robot 10 may be controlled by a user utilizing a host key, an application program, or the like. The state in suspension includes, but is not limited to, the position and posture of the cleaning robot 10 while suspending.

When the cleaning device is normally placed on the ground, the drive wheel part will retract into the machine body. When the cleaning robot 10 falls, the drive wheel will pop up and trigger the drive wheel drop sensor. In the present embodiment, if the drive wheel drop sensor is not triggered, it means that the cleaning device is still on the second target base without moving out of the second target base.

Step S1402: when an instruction to continue moving is received, third light rays, which are the light rays emitted by the indication lamp located at the centerline of the second target base, is not received, and a drive wheel drop sensor of the cleaning robot 10 is not triggered, or when the cleaning robot 10 enters a sleeping state and the drive wheel drop sensor of the cleaning robot 10 is not triggered, continuing to ignore the triggering signal generated by the shielded cliff sensor 123, and controlling the cleaning robot 10 to continue to move out of the second target base with the state in suspension.

After receiving the instruction to continue moving, the light sensing portion of the cleaning device may still sense the second light rays, and the drive wheel drop sensor is not triggered. This indicates that the cleaning device is still on the second target base. Therefore, it is necessary to continue to ignore the triggering signal of the cliff sensor 123 according to the above embodiment and continue to move.

Step S1403: when the drive wheel drop sensor of the cleaning robot 10 is triggered, monitoring all the sensing portions of the cleaning robot 10 according to a preset monitoring mode.

When the drive wheel drop sensor of the cleaning robot 10 is triggered, it means that the cleaning robot 10 has fallen. That is, the cleaning robot 10 has moved out of the second target base. Then, the cleaning task can be performed. Before performing the cleaning task, the cleaning robot 10 may monitor all the sensing portions to ensure the smooth completion of the cleaning task.

Further, when the type of the second target base is a charging base with mop cleaning function, and the second target task information indicates a mop cleaning task, the move-out strategy indicates that the cleaning robot 10 advances a distance corresponding to the type of the second target base, and the compatible move-out strategy indicates that the cleaning robot 10 advances a fifth preset movement distance.

Figure 9:
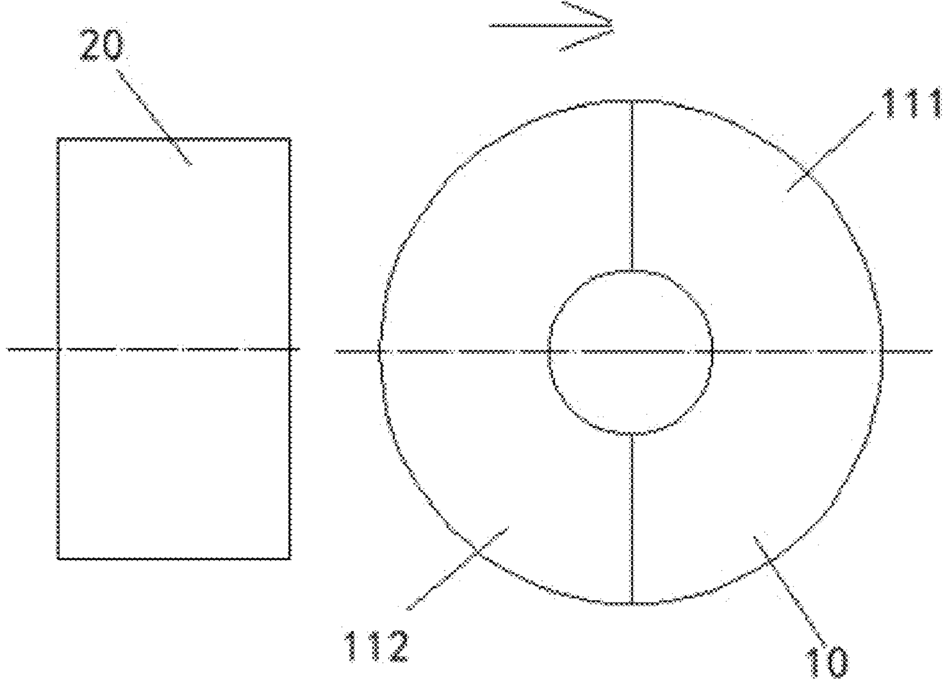
FIG. 9 is a schematic diagram of the cleaning robot moving out of the base in an advancing way in an optional embodiment of the present disclosure.

Before finishing the mop cleaning task at the second target base, the cleaning robot 10 needs to move onto the second target base in a backward way. The particular movement mode may refer to the above embodiment. As such, as shown in FIG. 9, the cleaning robot 10 needs to move out of the second target base in an advancing way. By advancing, it means that the front-facing portion 111 of the cleaning robot 10 is facing away from the second target base, and move away from the first target base.

Each type of base corresponds to a different retreating distance, and the respective retreating distance is determined based on the type of the base. For the compatible move-out strategy, it is required to have a distance that is suitable for moving out of all types of bases, that is, the maximum distance, i.e., the fifth preset movement distance, which may be set by the staff according to the type of the base, and is not strictly limited in the present embodiment.

Further, the method further includes:

In the process of controlling the cleaning robot 10 to advance and move out of the second target base, ignoring the triggering signal generated by the cliff sensor 123 at the middle and rear part of the bottom surface of the cleaning robot 10, and within a sixth preset movement distance, ignoring the triggering signal generated by the cliff sensor 123 at the front part of the bottom surface of the cleaning robot 10.

In the present embodiment, the triggering signal generated by the cliff sensor 123 at the middle and rear part of the bottom surface is ignored, so as to avoid the cliff sensor 123 at the middle and rear part from taking the height difference between the second target base and the ground as a cliff, reducing the misjudgment rate of the cliff sensor 123. The cliff sensor 123 located at the front part of the bottom surface of the cleaning robot 10 is triggered after the cleaning robot 10 moves the sixth preset movement distance, which means that the cleaning robot 10 may encounter a real cliff. At this time, the cleaning robot 10 is controlled to give an alarm, so that the user is prompted to check the cleaning robot 10. The cliff sensor 123 at the front part of the bottom surface of the cleaning robot 10 is triggered when the cleaning robot 10 moves within the fourth preset movement distance, and the triggering signal will still be ignored. This can not only reduce the influence of the cliff sensor 123 on the moving-out action, but also reduce the risk of the cleaning robot 10 falling from the real cliff. The sixth preset movement distance may be set by the staff themselves, and is not strictly limited in the present embodiment.

Further, the method further includes:

Step S1501: storing the state in suspension of the cleaning robot 10 when the cleaning robot 10 suspends advancement and movement out of the second target base.

The content of this step may refer to step S1401, and will not be repeated here.

Step S1502: when an instruction to continue moving is received, the third light rays are not received, and the drive wheel drop sensor of the cleaning robot 10 is not triggered, or when the cleaning robot 10 enters a sleeping state and the drive wheel drop sensor of the cleaning robot 10 is not triggered, continuing to ignore the triggering signal generated by the shielded cliff sensor 123, and controlling the cleaning robot 10 to continue to move out of the second target base with the state in suspension, where the third light rays are the light rays emitted by the indication lamp located at the centerline of the second target base.

The content of this step may refer to step S1402, and will not be repeated here.

Step S1503: when the drive wheel drop sensor of the cleaning robot 10 is triggered, monitoring all the sensing portions of the cleaning robot 10 according to a preset monitoring mode.

The content of this step may refer to step S1403, and will not be repeated here.

In some embodiments, after the cleaning robot returns to the base, the roller brush and the mop of the cleaning robot 10 may be monitored through the base, to determine whether the roller brush and the mop need to be cleaned. If so, they will be cleaned automatically. After the automatic cleaning process is finished, the cleaning robot 10 will be charged. Further, in some embodiments, the cleaning robot 10 first moves backward onto the base to clean the mop, exits from the base in the advancing way, and moves forward onto the base to perform roller brush cleaning and dust collecting, and then charges, thereby reducing the number of times for the cleaning robot 10 to move onto and out of the base.

In a third aspect, an embodiment of the present disclosure provides a cleaning robot 10, which includes a walking component, a cleaning component, and a controller.

The controller is configured to perform the above method for controlling the cleaning robot 10 to return to the base and/or the above method for controlling the robot to move out of the base.

Figure 12:
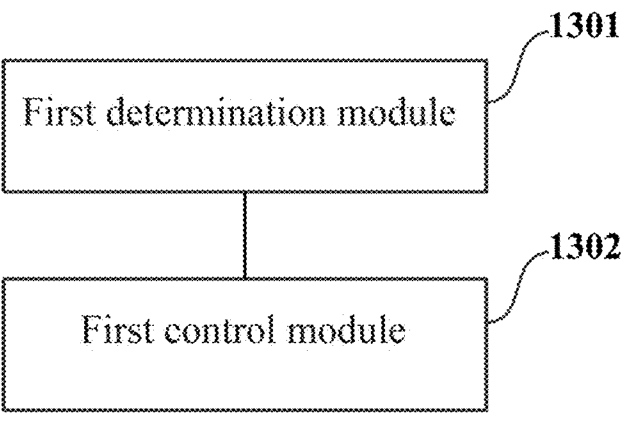
FIG. 12 is a structural diagram of an apparatus for the cleaning robot to return to the base according to an optional embodiment of the present disclosure.

In a fourth aspect, as shown in FIG. 12, an embodiment of the present disclosure provides an apparatus for controlling the cleaning robot 10 to return to a base, including:

- a first determination module 1301, for determining a type of a first target base and first target task information, where the first target base is a base to be docked with the cleaning robot 10, and the first target task information is information related to the task that needs to be performed by the cleaning robot 10 for returning to the first target base; and
- a first control module 1302, for controlling, based on the type of the first target base and the first target task information, the cleaning robot 10 to move onto the first target base according to a respective movement strategy.

Figure 13:
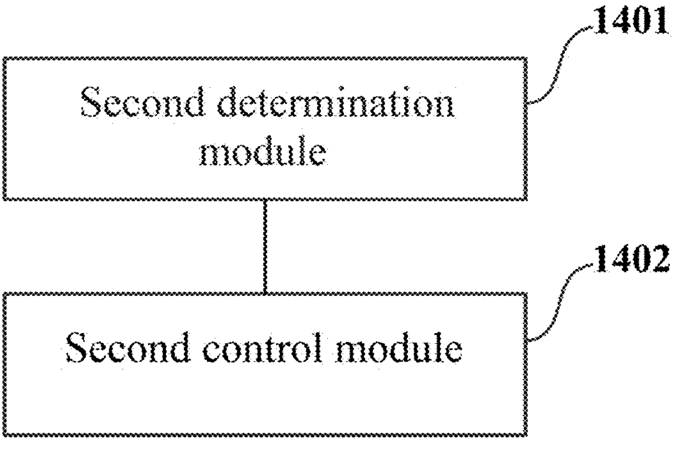
FIG. 13 is a structural diagram of an apparatus for the cleaning robot to move out of the base according to an optional embodiment of the present disclosure.

In a fifth aspect, as shown in FIG. 13, an embodiment of the present disclosure provides an apparatus for controlling the cleaning robot 10 to move out of a base, including:

- a second determination module 1401, for determining a type of a second target base and second target task information, where the second target base is a base being currently docked with the cleaning robot 10, and the second target task information is information about the task performed by the cleaning robot 10 on the second target base;
- a second control module 1402, for controlling, based on the type of the second target base and the second target task information, the cleaning robot 10 to move out of the second target base according to a respective move-out strategy.

In a sixth aspect, an embodiment of the present disclosure provides a cleaning robot 10, which includes a walking component, a cleaning component and a controller.

The controller is configured to perform the above method for controlling the cleaning robot 10 to return to the base and/or the above method for controlling the robot to move out of the base.

In a seventh aspect, an embodiment of the present disclosure provides an electronic device, which includes a processor and a memory. The memory is used to store at least one executable instruction, which causes the processor to carry out the steps in the above method for controlling the cleaning robot 10 to return to the base and/or the above method for controlling the robot to move out of the base.

In an eighth aspect, an embodiment of the present disclosure provides a computer-readable storage medium for storing computer program instructions. The computer program instructions, when called and executed by a processor, implement the steps in the above method for controlling the cleaning robot 10 to return to the base and/or the above method for controlling the robot to move out of the base.

The present disclosure has been illustrated through the above embodiments. But it should be understood that the above embodiments are only for the purpose of illustration and description, and are not intended to limit the present disclosure to the scope of the described embodiments. In addition, those skilled in the art can understand that the present disclosure is not limited to the above embodiments, and various variants and modifications may be made according to the teachings of the present disclosure, which shall fall within the claimed scope of the present disclosure. The scope of the present disclosure is defined by the appended claims and their equivalents.

What is claimed is:

1. A method for controlling a cleaning robot to return to a base, comprising:

determining a type of a first target base and first target task information, wherein the first target base is a base to be docked with the cleaning robot, and the first target task information is information related to a task that needs to be performed by the cleaning robot for returning to the first target base; and controlling, based on the type of the first target base and the first target task information, the cleaning robot to move onto the first target base according to a respective movement strategy, wherein determining the type of the first target base comprises:

determining the type of the first target base based on at least one of: a mode in which the cleaning robot moves onto the first target base, or a starting point for current movement of the cleaning robot.

2. The method according to claim 1, wherein determining the type of the first target base further comprises:

acquiring the mode in which the cleaning robot moves onto the first target base and the starting point for current movement of the cleaning robot;

when the cleaning robot moves onto the first target base in an automatic mode and the starting point for the current movement of the cleaning robot is the base, acquiring a first base type and a second base type, wherein the first base type is the type of the base acting as the starting point for the current movement of the cleaning robot, and the second base is the type of the first target base determined during the movement of the cleaning robot towards the first target base; and determining the type of the first target base based on the first base type and the second base type.

3. The method according to claim 2, wherein determining the type of the first target base based on the first base type and the second base type comprises:

determining whether the first base type and the second base type are the same, and determining the first base type to be the type of the first target base if the first base type is the same as the second base type; and determining the second base type to be the type of the first target base if the first base type is different from the second base type.

4. The method according to claim 2, wherein determining the type of the first target base further comprises:

when the cleaning robot moves onto the first target base in an automatic mode and the starting point for the current movement of the cleaning robot is not the base, acquiring the second base type, and determining the second base type to be the type of the first target base.

5. The method according to claim 2, wherein determining the type of the first target base further comprises:

determining whether a communication signal sent by the first target base is received when the cleaning robot moves onto the first target base in a manual mode, and determining a base type carried in the communication signal to be the type of the first target base if the communication signal sent by the first target base is received; and determining a base type stored by the cleaning robot to be the type of the first target base if the communication signal sent by the first target base is not received.

6. The method according to claim 2, wherein acquiring the second base type comprises:

receiving light rays emitted by a signal lamp on the first target base; and determining the second base type according to the light rays emitted by the signal lamp.

7. The method according to claim 6, wherein the signal lamp comprises far-field lamps located on both sides of a centerline of the base and a central seam lamp located on a centerline of the base, and receiving the light rays emitted by the signal lamp on the base comprises:

receiving first light rays when the cleaning robot is at a first preset distance from the first target base, wherein the first light rays are light rays emitted by the far-field lamp; and receiving second light rays when the cleaning robot moves near the first target base, wherein the second light rays are light rays emitted by the central seam lamp.

8. The method according to claim 7, wherein determining the second base type according to the light rays emitted by the signal lamp comprises:

converting the first light rays to obtain a first code;

determining an initial type of the first target base based on the first code;

determining whether the initial type comprises a subtype, and converting the second light rays to obtain a second code if the initial type comprises the subtype;

determining, based on the second code, a subtype to which the first target base belongs, and determining the subtype to be the second base type; and determining the initial type to be the second base type if the initial type does not comprise the subtype.

9. The method according to claim 1, wherein after determining the type of the first target base, the method further comprises:

storing the type of the first target base to update the base type stored by the cleaning robot.

10. A method for controlling a cleaning robot to move out of a base, comprising:

determining a type of a second target base and second target task information, wherein the second target base is the base being currently docked with the cleaning robot, and the second target task information is information about a task performed by the cleaning robot on the second target base; and controlling, based on the type of the second target base and the second target task information, the cleaning robot to move out of the second target base according to a respective move-out strategy, wherein determining the type of the second target base comprises:

acquiring a base type stored by the cleaning robot as the second target base; and the method further comprises:

receiving a communication signal sent by the second target base in the process of controlling the cleaning robot to move out of the second target base according to the respective move-out strategy, determining whether a base type carried in the communication signal is the same as the base type stored by the cleaning robot, and controlling the cleaning robot to continue or not continue moving with a current move-out strategy based on the determination result.

11. The method according to claim 10, further comprising:

controlling the cleaning robot to continue moving with the current move-out strategy if the base type carried in the communication signal is the same as the base type stored by the cleaning robot; and controlling the cleaning robot to move according to a compatible move-out strategy if the base type carried in the communication signal is different from the base type stored by the cleaning robot.

12. The method according to claim 11, wherein in a case that the type of the second target base is a charging base with charging function only or a charging base with dust collecting function, and the second target task information indicates a charging task and/or a dust collecting task, the move-out strategy indicates that the cleaning robot retreats a distance corresponding to the type of the second target base, and the compatible move-out strategy indicates that the cleaning robot retreats a third preset movement distance.

13. The method according to claim 12, further comprising:

ignoring a triggering signal generated by a cliff sensor at a front part of a bottom surface of the cleaning robot in the process of controlling the cleaning robot to retreat and move out of the second target base, and ignoring a triggering signal generated by a cliff sensor at a middle and rear part of the bottom surface of the cleaning robot within a fourth preset movement distance.

14. The method according to claim 13, further comprising:

storing, when the cleaning robot suspends an action of retreating and moving out of the second target base, a state in suspension of the cleaning robot;

when an instruction to continue moving is received, third light rays are not received, and a drive wheel drop sensor of the cleaning robot is not triggered, or when the cleaning robot enters a sleeping state and the drive wheel drop sensor of the cleaning robot is not triggered, continuing to ignore a triggering signal generated by a shielded cliff sensor, and controlling the cleaning robot to continue moving out of the second target base with the state in suspension, wherein the third light rays are light rays emitted by an indication lamp located at a centerline of the second target base; and monitoring all sensing portions of the cleaning robot according to a preset monitoring mode when the drive wheel drop sensor of the cleaning robot is triggered.

15. The method according to claim 11, wherein in a case that the type of the second target base is a charging base with mop cleaning function, and the second target task information is a mop cleaning task, the move-out strategy indicates that the cleaning robot advances a distance corresponding to the type of the second target base, and the compatible move-out strategy indicates that the cleaning robot advances a fifth preset movement distance.

16. The method according to claim 15, further comprising:

ignoring a triggering signal generated by a cliff sensor at a middle and rear part of a bottom surface of the cleaning robot in the process of controlling the cleaning robot to advance and move out of the second target base, and ignoring a triggering signal generated by a cliff sensor at a front part of the bottom surface of the cleaning robot within a sixth preset movement distance.

17. The method according to claim 16, further comprising:

storing a state in suspension of the cleaning robot when the cleaning robot suspends advancement and movement out of the second target base;

when an instruction to continue moving is received, the third light rays are not received, and a drive wheel drop sensor of the cleaning robot is not triggered, or when the cleaning robot enters a sleeping state and the drive wheel drop sensor of the cleaning robot is not triggered, continuing to ignore a triggering signal generated by a shielded cliff sensor, and controlling the cleaning robot to continue moving out of the second target base with the state in suspension, wherein the third light rays are light rays emitted by an indication lamp located at a centerline of the second target base; and monitoring all sensing portions of the cleaning robot according to a preset monitoring mode when the drive wheel drop sensor of the cleaning robot is triggered.

18. A cleaning robot, comprising a movable component, a cleaning component, and a controller, wherein the controller is configured to perform the method for controlling the cleaning robot to move out of the base according to claim 10.

19. A cleaning robot, comprising a movable component, a cleaning component, and a controller, wherein the controller is configured to perform a method for controlling the cleaning robot to return to a base, comprising:

determining a type of a first target base and first target task information, wherein the first target base is the base to be docked with the cleaning robot, and the first target task information is information related to a task that needs to be performed by the cleaning robot for returning to the first target base; and controlling, based on the type of the first target base and the first target task information, the cleaning robot to move onto the first target base according to a respective movement strategy, wherein determining the type of the first target base comprises:

determining the type of the first target base based on at least one of: a mode in which the cleaning robot moves onto the first target base, or a starting point for current movement of the cleaning robot.

* * * * *